(12) United States Patent
Yamamoto et al.

(10) Patent No.: US 8,456,422 B2
(45) Date of Patent: Jun. 4, 2013

(54) INPUT APPARATUS, CONTROL APPARATUS, CONTROL SYSTEM, CONTROL METHOD, AND HANDHELD APPARATUS

(75) Inventors: Kazuyuki Yamamoto, Kanagawa (JP); Takashi Masuda, Tokyo (JP); Toshio Mamiya, Tokyo (JP); Hidetoshi Kabasawa, Saitama (JP); Yoshiharu Saiki, Tokyo (JP); Hideaki Kumagai, Kanagawa (JP); Katsuhiko Yamada, Tokyo (JP)

(73) Assignee: Sony Corporation, Tokyo (JP)

( * ) Notice: Subject to any disclaimer, the term of this patent is extended or adjusted under 35 U.S.C. 154(b) by 434 days.

(21) Appl. No.: 12/517,497

(22) PCT Filed: Oct. 9, 2008

(86) PCT No.: PCT/JP2008/068397
§ 371 (c)(1),
(2), (4) Date: Jun. 15, 2009

(87) PCT Pub. No.: WO2009/048113
PCT Pub. Date: Apr. 16, 2009

(65) Prior Publication Data
US 2010/0201619 A1    Aug. 12, 2010

(30) Foreign Application Priority Data

Oct. 12, 2007    (JP) .................................. 2007-267053

(51) Int. Cl.
*G09G 5/08*    (2006.01)
(52) U.S. Cl.
USPC ........... 345/158; 345/161; 345/169; 345/173; 348/734
(58) Field of Classification Search
USPC .................. 345/158, 161, 169, 173; 348/734
See application file for complete search history.

(56) References Cited

U.S. PATENT DOCUMENTS 5,554,980 A    9/1996    Hashimoto et al.
6,072,470 A *  6/2000    Ishigaki ....................... 345/158

FOREIGN PATENT DOCUMENTS

| JP | 04-282717 | 10/1992 |
| JP | 07-284166 | 10/1995 |
| JP | 09-009369 | 1/1997 |
| JP | 2001-056743 | 2/2001 |
| JP | 3264291 | 12/2001 |

OTHER PUBLICATIONS

European Search Report mailed Jul. 5, 2011, for corresponding European Patent Appln. No. 08837921.9.
International Search Report dated Feb. 3, 2009, for corresponding Patent Application PCT/JP2008/068397.

* cited by examiner

*Primary Examiner* — Lun-Yi Lao
*Assistant Examiner* — Shaheda Abdin
(74) *Attorney, Agent, or Firm* — K&L Gates LLP

(57) ABSTRACT

An input apparatus, a control apparatus, a control system, a control method, and a handheld apparatus with which a user can easily control a movement and stop of a pointer displayed on a screen are provided. An input apparatus includes a sensor unit for detecting a movement of a casing and a button. An MPU outputs a determination code when a press of the button is released within a first time period. On the other hand, when the button is pressed and held for a time period equal to or longer than a first time period, a movement command is output from after an elapse of the first time period. Accordingly, the button is provided with a function corresponding to a determination input button and a function corresponding to an input button for controlling a movement and stop of a pointer, for example. As a result, a user can easily control the movement and stop of the pointer without mixing up an input operation for moving and stopping the pointer with other input operations.

13 Claims, 17 Drawing Sheets

(A)

(B)

INPUT APPARATUS, CONTROL APPARATUS, CONTROL SYSTEM, CONTROL METHOD, AND HANDHELD APPARATUS

CROSS REFERENCE TO RELATED APPLICATIONS

The present application is a National Stage of International Application No. PCT/JP2008/068397 filed on Oct. 9, 2008 and which claims priority to Japanese Patent Application No. 2007-267053 filed on Oct. 12, 2007, the entire contents of which are being incorporated herein by reference.

BACKGROUND

The present disclosure relates to a 3-dimensional operation input apparatus for operating a GUI (Graphical User Interface), a control apparatus for controlling the GUI in accordance with operational information, a control system including those apparatuses, a control method, and a handheld apparatus.

Pointing devices, particularly a mouse and a touchpad, are used as controllers for GUIs widely used in PCs (Personal Computers). Not just as HIs (Human Interfaces) of PCs as in related art, the GUIs are now starting to be used as an interface for AV equipment and game devices used in living rooms etc. with, for example, televisions as image media. Various pointing devices that a user is capable of operating 3-dimensionally are proposed as controllers for the GUIs of this type (see, for example, Japanese Patent Application Laid-open No. 2001-56743 (paragraphs [0030] and [0031], FIG. 3), and Japanese Patent No. 3,264,291 (paragraphs [0062] and [0063])).

Japanese Patent Application Laid-open No. 2001-56743 (paragraphs [0030] and [0031], FIG. 3) discloses an input apparatus including angular velocity gyroscopes of two axes, that is, two angular velocity sensors. The input apparatus detects angular velocities about two orthogonal axes by the two angular velocity sensors, generates, in accordance with the angular velocities, a signal as positional information of a cursor (pointer) displayed by a display means, and transmits it to a control apparatus.

Incidentally, when moving a pointer displayed on a screen using a pointing device, a user holds the pointing device and swings it vertically or laterally using a rotation of an arm or wrist to thus move the pointer.

However, there are limitations to the rotation of an arm or wrist of the user. For example, in a case where the arm of the user is fully extended in a right-hand direction or the wrist cannot be rotated further in the right-hand direction, the pointer displayed on the screen cannot be moved further in the right-hand direction.

For moving the pointer on the screen irrespective of such limitations on an operation of human beings, it is considered that providing a dedicated input key (movement control button) for controlling a movement and stop of the pointer to the pointing device is an effective means, for example. In this case, the pointing device executes processing for moving the pointer on the screen only when the movement control button is pressed or not pressed.

Incidentally, the pointing device is generally provided with an input key that is used frequently, such as a determination button. Therefore, if the movement control button is provided specially to the pointing device, the pointing device will thus be provided with a plurality of frequently-used input keys.

As a result, the determination button and the movement control button may become mixed up and the user may press the determination button while meaning to press the movement control button, for example. In contrast, the user may press the movement control button while meaning to press the determination button, with the result that proficiency has been required for the user to master those buttons.

SUMMARY

It is an object of the present invention to provide an input apparatus, a control apparatus, a control system, a control method, and a handheld apparatus with which a user can easily control a movement and stop of a pointer displayed on a screen.

To achieve the object above, according to an embodiment, there is provided an input apparatus outputting a command for controlling a movement of an image displayed on a screen, including a casing, a sensor, an operation section, an output means, and an output control means.

The sensor detects a 3-dimensional movement of the casing and outputs a detection signal corresponding to the movement of the casing.

The operation section is used to input an operation signal with respect to the input apparatus that is unrelated to the movement of the casing.

The output means outputs a movement command that corresponds to a displacement amount of the image on the screen, the displacement amount corresponding to the detection signal, and an operation command that corresponds to the operation signal input via the operation section.

The output control means controls the output means to output, when the input of the operation signal is not canceled within a first time period, the movement command from after an elapse of the first time period until the input of the operation signal is canceled, and output the operation command when the input of the operation signal is canceled within the first time period.

The "image" includes a pointer, an icon, a window, a map, an electronic program guide (EPG (Electronic Program Guide)), and the like displayed on the screen.

In an embodiment, the operation command is output when the input of the operation signal is canceled within the first time period, whereas, when not canceled within the first time period, the movement command is output after the elapse of the first time period. Accordingly, one operation section is provided with a function corresponding to a determination input button and a function corresponding to a dedicated input button for controlling a movement and stop of an image (e.g., pointer), for example. As a result, a user can easily control the movement and stop of the pointer without mixing up an input operation for moving and stopping the pointer with other input operations.

Furthermore, in the embodiment, since the operation section includes the two functions described above, other operation sections can be omitted. Accordingly, a reduction in costs and size of the input apparatus becomes possible, and a simple and neat design can be realized.

In the input apparatus, the output control means may control the output means to output, when the operation signal is re-input within a second time period since the cancel of the input of the operation signal within the first time period but the input of the operation signal is not canceled within the first time period, the movement command and the operation command from after the elapse of the first time period until the input of the operation signal is canceled.

In the present embodiment, in a case where, after an input operation is made within the first time period via the operation section, the input operation is made again within the second time period but the input operation is not canceled within the first time period, the movement command and the operation command are continued to be output until the input operation is canceled.

In this case, a control apparatus that is input with the various commands output by the output means only needs to perform control so that a drag operation is displayed on the screen when both the operation command and the movement command are input. Accordingly, the drag operation can be displayed on the screen.

In the input apparatus, the output control means may control the output means to output the operation command when the operation signal is not re-input within the second time period since the cancel of the input of the operation signal within the first time period.

The input apparatus may further include a variable means for varying the first time period.

Accordingly, the user can arbitrarily set the first time period that matches his/her own operational feeling, with the result that an operational feeling when performing the input operation to the operation section can be improved.

According to another embodiment, there is provided an input apparatus outputting a command for controlling a movement of an image displayed on a screen to a control apparatus to control display of the screen, including a casing, a sensor, one operation section, an output means, and an output control means.

The sensor detects a 3-dimensional movement of the casing and outputs a detection signal corresponding to the movement of the casing.

The one operation section is used to input an operation signal with respect to the input apparatus, that is unrelated to the movement of the casing.

The output means outputs a movement command that corresponds to a displacement amount of the image on the screen, the displacement amount corresponding to the detection signal, and an operation command that corresponds to the operation signal input via the operation section.

The output control means controls an output timing of the movement command and the operation command in accordance with an input timing of the output operation signal, for causing the control apparatus to control display of the movement of the image, execution of predetermined processing, or display of a drag operation of the image.

"Drag" means moving an image such as an icon displayed on the screen while virtually holding it on the screen. An image to be a target of drag includes an icon, a frame of a window, a map, an electronic program guide, and the like displayed on the screen.

In the embodiment, the output timing of the movement command and the operation command is controlled in accordance with the input timing of the operation signal output from the one operation section. The control apparatus controls the display of the movement of the image (e.g., pointer), the execution of the predetermined processing, or the display of drag of the image (e.g., icon) in accordance with the input timing of the movement command and the operation command output from the input apparatus.

Accordingly, the user can execute an input operation such as moving a pointer, dragging an icon, and selecting an icon (determination) with a simple input operation to the operation section using one finger. Furthermore, in the embodiment, since a single operation section includes various functions described above, other operation sections can be omitted. Accordingly, a reduction in costs and size of the input apparatus becomes possible, and a simple and neat design can be realized.

According to an embodiment, there is provided a control apparatus controlling display of a movement of an image on a screen in accordance with a movement command and an operation command output from an input apparatus including a casing, a sensor to detect a 3-dimensional movement of the casing and output a detection signal corresponding to the movement of the casing, an operation section to input an operation signal with respect to the input apparatus that is unrelated to the movement of the casing, an output means for outputting the movement command that corresponds to a displacement amount of the image on the screen, the displacement amount corresponding to the detection signal, and the operation command that corresponds to the operation signal input via the operation section, and an output control means for controlling the output means to output, when the input of the operation signal is not canceled within a first time period, the movement command from after an elapse of the first time period until the input of the operation signal is canceled, output the operation command when the input of the operation signal is canceled within the first time period, and output, when the operation signal is re-input within a second time period since the cancel of the input of the operation signal within the first time period but the input of the operation signal is not canceled within the first time period, the movement command and the operation command from after the elapse of the first time period until the input of the operation signal is canceled, the control apparatus including a reception means and a processing means.

The reception means receives the movement command and the operation command output from the input apparatus.

The processing means controls the display of the movement of the image in accordance with the movement command when the movement command is input via the reception means, executes predetermined processing in accordance with the operation command when the operation command is input, and controls display of drag of the image when both the movement command and the operation command are input.

According to another embodiment, there is provided a control apparatus controlling display of a movement of an image on a screen in accordance with a movement command and an operation command output from an input apparatus including a casing, a sensor to detect a 3-dimensional movement of the casing and output a detection signal corresponding to the movement of the casing, one operation section to input an operation signal with respect to the input apparatus that is unrelated to the movement of the casing, an output means for outputting the movement command that corresponds to a displacement amount of the image on the screen, the displacement amount corresponding to the detection signal, and the operation command that corresponds to the operation signal input via the operation section, and an output control means for controlling an output timing of the movement command and the operation command in accordance with an input timing of the output operation signal, the control apparatus including a reception means and a processing means.

The reception means receives the movement command and the operation command output from the input apparatus.

The processing means controls the display of the movement of the image, execution of predetermined processing, or display of a drag operation of the image in accordance with an input timing of the movement command and the operation command input via the reception means.

According to an embodiment, there is provided a control system controlling a movement of an image displayed on a screen, including an input apparatus and a control apparatus.

The input apparatus includes a casing, a sensor, an operation section, an output means, and an output control means.

The sensor detects a 3-dimensional movement of the casing and outputs a detection signal corresponding to the movement of the casing.

The operation section is used to input an operation signal with respect to the input apparatus that is unrelated to the movement of the casing.

The output means outputs a movement command that corresponds to a displacement amount of the image on the screen, the displacement amount corresponding to the detection signal, and an operation command that corresponds to the operation signal input via the operation section.

The output control means controls the output means to output, when the input of the operation signal is not canceled within a first time period, the movement command from after an elapse of the first time period until the input of the operation signal is canceled, and output the operation command when the input of the operation signal is canceled within the first time period.

The control apparatus includes a reception means and a processing means.

The reception means receives the movement command and the operation command output from the input apparatus.

The processing means controls a movement of a pointer displayed on the screen in accordance with the movement command input via the reception means, and executes predetermined processing in accordance with the operation command input via the reception means.

According to another embodiment, there is provided a control system controlling a movement of an image displayed on a screen, including an input apparatus and a control apparatus.

The input apparatus includes a casing, a sensor, one operation section, an output means, and an output control means.

The sensor detects a 3-dimensional movement of the casing and outputs a detection signal corresponding to the movement of the casing.

The one operation section is used to input an operation signal with respect to the input apparatus that is unrelated to the movement of the casing.

The output means outputs a movement command that corresponds to a displacement amount of the image on the screen, the displacement amount corresponding to the detection signal, and an operation command that corresponds to the operation signal input via the operation section.

The output control means controls an output timing of the movement command and the operation command in accordance with an input timing of the operation signal.

The control apparatus includes a reception means and a processing means.

The reception means receives the movement command and the operation command output from the input apparatus.

The processing means controls display of the movement of the image, execution of predetermined processing, or display of a drag operation of the image in accordance with an input timing of the movement command and the operation command input via the reception means.

According to an embodiment, there is provided a control method including detecting a 3-dimensional movement of a casing of an input apparatus and outputting a detection signal corresponding to the movement of the casing.

A movement command that corresponds to a displacement amount of an image on a screen is output, the displacement amount corresponding to the output detection signal.

A movement of the image on the screen is controlled in accordance with the output movement command.

An operation command that corresponds to an operation signal with respect to the input apparatus that is unrelated to the movement of the casing is output, the operation signal being input via an operation section of the casing.

Predetermined processing is executed in accordance with the operation command.

The output is controlled so that, when the input of the operation signal is not canceled within a first time period, the movement command is output from after an elapse of the first time period until the input of the operation signal is canceled, and the operation command is output when the input of the operation signal is canceled within the first time period.

According to another embodiment, there is provided a control method including detecting a 3-dimensional movement of a casing of an input apparatus and outputting a detection signal corresponding to the movement of the casing.

A movement command that corresponds to a displacement amount of an image on a screen is output, the displacement amount corresponding to the output detection signal.

A movement of the image on the screen is controlled in accordance with the output movement command.

An operation command that corresponds to an operation signal with respect to the input apparatus that is unrelated to the movement of the casing is output, the operation signal being input via one operation section provided to the casing.

An output timing of the movement command and the operation command is controlled in accordance with an input timing of the output operation signal.

Display of the movement of the image, execution of predetermined processing, or display of a drag operation of the image is controlled in accordance with an input timing of the movement command and the operation command.

According to an embodiment, there is provided a handheld apparatus controlling a movement of an image displayed on a screen, including a display section, a casing, a sensor, an operation section, an output means, an output control means, and a processing means.

The display section displays the screen.

The sensor detects a 3-dimensional movement of the casing and outputs a detection signal corresponding to the movement of the casing.

The operation section is used to input an operation signal with respect to the handheld apparatus that is unrelated to the movement of the casing.

The output means outputs a movement command that corresponds to a displacement amount of the image on the screen, the displacement amount corresponding to the detection signal, and an operation command that corresponds to the operation signal input via the operation section.

The output control means controls the output means to output, when the operation signal is input but the input of the operation signal is not canceled within a first time period, the movement command from after an elapse of the first time period until the input of the operation signal is canceled, and output the operation command when the input of the operation signal is canceled within the first time period.

The processing means controls display of the screen so that the image is moved in accordance with the output movement command, and executes predetermined processing in accordance with the output operation command.

According to another embodiment, there is provided a handheld apparatus controlling a movement of an image displayed on a screen, including a display section, a casing, a sensor, one operation section, an output means, an output control means, and a processing means.

The display section displays the screen.

The sensor detects a 3-dimensional movement of the casing and outputs a detection signal corresponding to the movement of the casing.

The one operation section is used to input an operation signal with respect to the handheld apparatus that is unrelated to the movement of the casing.

The output means outputs a movement command that corresponds to a displacement amount of the image on the screen, the displacement amount corresponding to the detection signal, and an operation command that corresponds to the operation signal input via the operation section.

The output control means controls an output timing of the movement command and the operation command in accordance with an input timing of the output operation signal.

The processing means controls display of the movement of the image, execution of predetermined processing, or display of a drag operation of the image in accordance with an input timing of the movement command and the operation command that have been output.

As described above, according to the embodiments, it is possible to provide an input apparatus, a control apparatus, a control system, a control method, and a handheld apparatus with which a user can easily control a movement and stop of a pointer displayed on a screen.

Additional features and advantages are described herein, and will be apparent from, the following Detailed Description and the figures.

DETAILED DESCRIPTION

Hereinafter, embodiments will be described with reference to the drawings.

Figure 1:
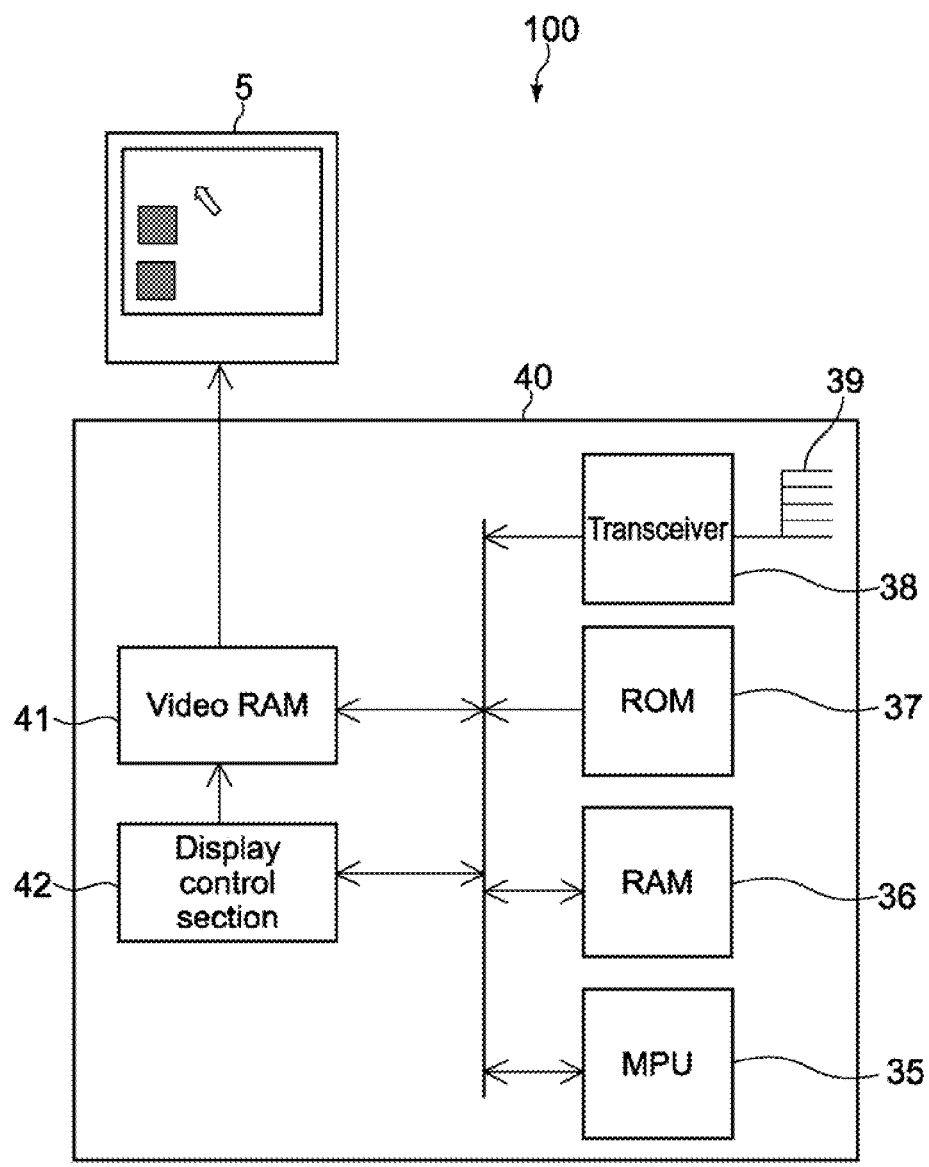
FIG. 1 A diagram showing a control system according to an embodiment.
Figure 1:

FIG. 1 is a diagram showing a control system according to an embodiment. A control system 100 includes a display apparatus 5, a control apparatus 40, and an input apparatus 1.

Figure 2:
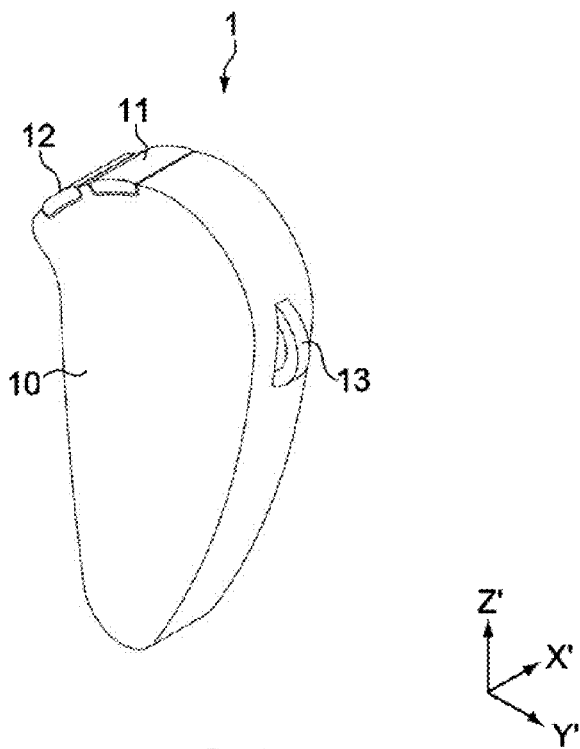
FIG. 2 A perspective diagram showing an input apparatus.

FIG. 2 is a perspective diagram showing the input apparatus 1. The input apparatus 1 is of a size that a user is capable of holding. The input apparatus 1 includes a casing 10. Further, the input apparatus 1 includes an operation section 23 including a button 11 provided at a center of an upper portion of the casing 10, a button 12 adjacent to the button 11, and a button 13 provided on a side surface of the casing 10.

Typically, the buttons 11 and 12 are each a press-type button, and push buttons or capacitance-type touch buttons are used. Typically, the button 13 is a rotary wheel button. However, the operation section 23 is not limited thereto, and a bar-type operation section 23 that is operated with one end as a fulcrum or a slide-type operation section 23 may be used instead. The operation section 23 includes a built-in switch (not shown), and the switch detects an operation of the user with respect to the operation section and outputs an operation signal. An optical sensor or a capacitance sensor may be used for the switch that outputs operation signals.

The button 11 has a function corresponding to a left button of a mouse as an input device used for a PC, and the button 12 adjacent to the button 11 has a function corresponding to a right button of a mouse, for example. For example, an operation of selecting an icon 4 (see FIG. 5) may be carried out by clicking the button 11, an operation of opening a file may be carried out by double-clicking the button 11, and a screen 3 may be scrolled by a rotation of the wheel button. The icons are images on the screen 3 representing functions of programs, execution commands, file contents, and the like on the computer. Locations of the buttons 11 and 12 and the wheel button 13, a content of a command issued, and the like can arbitrarily be changed.

It should be noted that at least one of the buttons 11, 12, and 13 may be allocated with a function corresponding to a movement control button for controlling a movement and stop of a pointer 2 displayed on the screen 3, the details of which will be described later.

Figure 3:
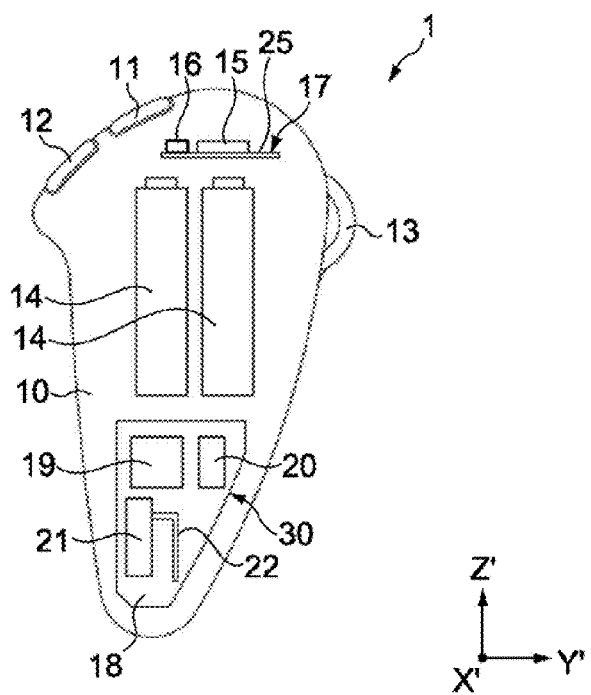
FIG. 3 A diagram schematically showing an internal structure of the input apparatus.
Figure 4:
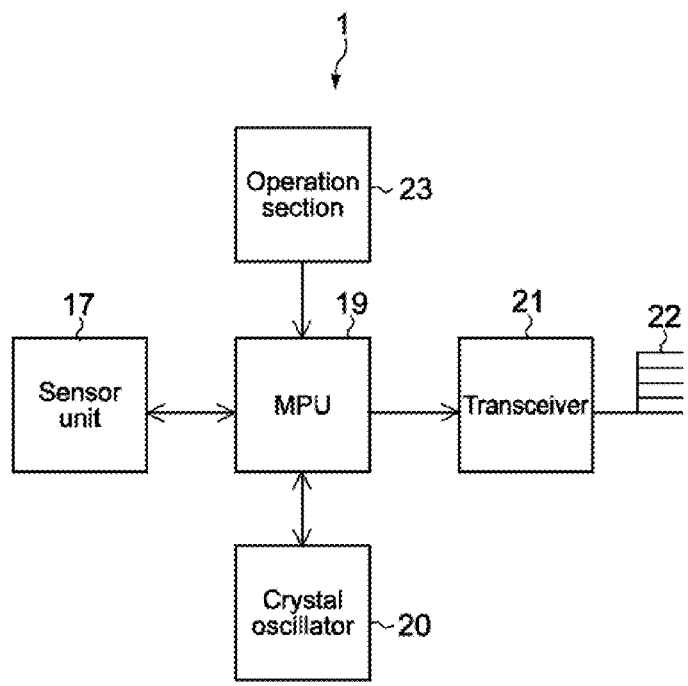
FIG. 4 A block diagram showing an electrical structure of the input apparatus.

FIG. 3 is a diagram schematically showing an internal structure of the input apparatus 1. FIG. 4 is a block diagram showing an electrical structure of the input apparatus The input apparatus 1 includes a sensor unit 17, a control unit 30, and batteries 14.

Figure 8:
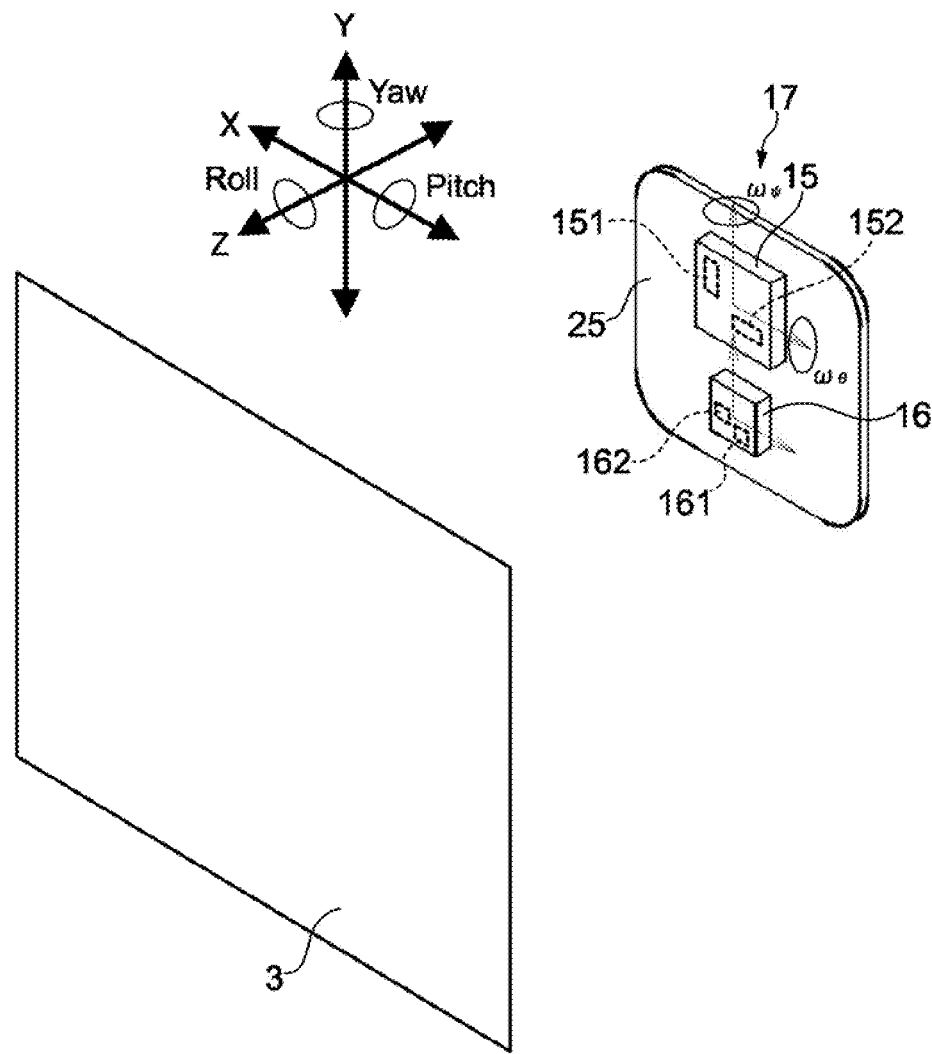
FIG. 8 A perspective diagram showing a sensor unit.

FIG. 8 is a perspective diagram showing the sensor unit 17.

The sensor unit 17 includes an acceleration sensor unit 16 for detecting accelerations in different angles such as along two orthogonal axes (X' axis and Y' axis). Specifically, the acceleration sensor unit 16 includes two sensors, that is, a first acceleration sensor 161 and a second acceleration sensor 162.

The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first and second angular velocity sensors 151 and 152, a vibration gyro sensor for detecting Coriolis force in proportion to an angular velocity is used. As each of the first and second acceleration sensors 161 and 162, any sensor such as a piezoresistive sensor, a piezoelectric sensor, or a capacitance sensor may be used.

in descriptions on FIGS. 2 and 3, a longitudinal direction of the casing 10 is referred to as Z' direction, a thickness direction of the casing 10 is referred to as X' direction, and a width direction of the casing 10 is referred to as Y' direction for convenience. In this case, the sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X' axis and the Y' axis. In the specification, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Further, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

The control unit 30 includes a main substrate 18, an MPU 19 (Micro Processing Unit) (or CPU) mounted on the main substrate 18, a crystal oscillator 20, a transceiver 21, and an antenna 22 printed on the main substrate 18.

The MPU 19 includes a built-in volatile or nonvolatile memory requisite therefor. The MPU 19 is input with a detection signal from the sensor unit 17, an operation signal from the operation section 23, and the like, and executes various kinds of operational processing in order to generate predetermined control signals (commands) in response to those input signals.

The transceiver 21 (output means) transmits, as radio signals (e.g., RF radio signals), the command generated in the MPU 19 to the control apparatus 40 via the antenna 22. The transceiver 21 is also capable of receiving various signals transmitted from the control apparatus 40.

The crystal oscillator 20 generates reference pulses and supplies them to the MPU 19. The MPU 19 is capable of generating clocks of various frequencies based on the reference pulses. As the batteries 14, dry cell batteries, rechargeable batteries, and the like are used.

The control apparatus 40 is a computer and includes an MPU 35 (or CPU), a RAM 36, a ROM 37, a video RAM 41, a display control section 42, an antenna 39, and a transceiver 38.

The transceiver 38 receives a signal of the command transmitted from the input apparatus 1 via the antenna 39. The transceiver 38 is also capable of transmitting various predetermined signals to the input apparatus 1. The MPU 35 analyzes the command and executes various kinds of operational processing. The display control section 42 mainly generates screen data to be displayed on the screen 3 of the display apparatus 5 under control of the MPU 35. The video RAM 41 as a working area of the display control section 42 temporarily stores the generated screen data.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like.

Figure 5:
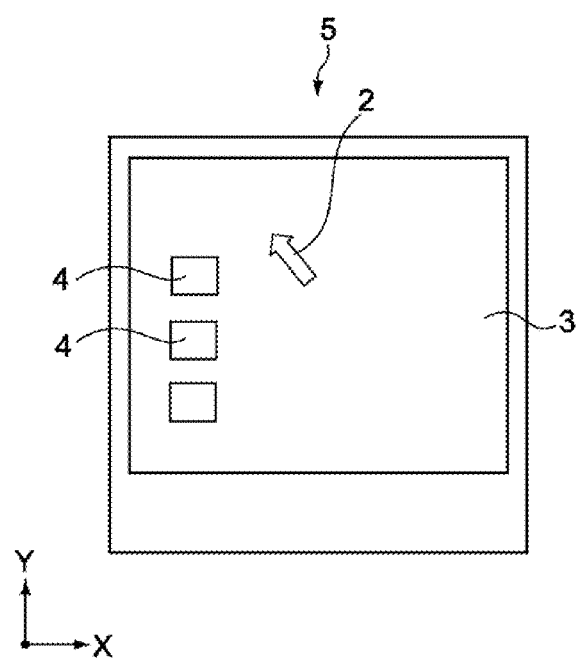
FIG. 5 A diagram showing an example of a screen displayed on a display apparatus.

FIG. 5 is a diagram showing an example of the screen 3 displayed on the display apparatus 5. UIs such as the icons 4 and the pointer 2 are displayed on the screen 3. It should be noted that on the screen 3, the horizontal direction is referred to as X-axis direction and the vertical direction is referred to as Y-axis direction.

Figure 6:
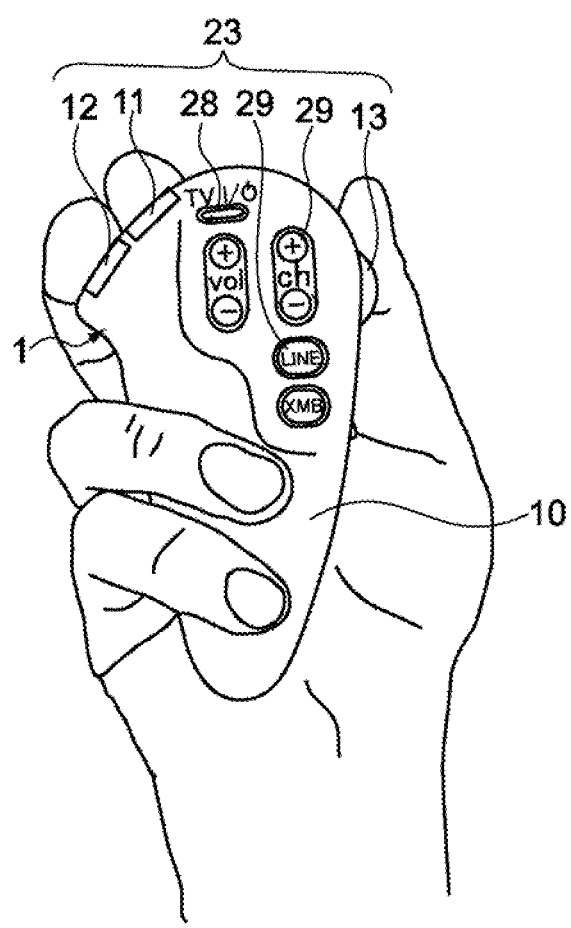
FIG. 6 A diagram showing a state where a user is holding the input apparatus.

FIG. 6 is a diagram showing a state where a user is holding the input apparatus 1. As shown in FIG. 6, the input apparatus 1 may include, as the operation section 23, in addition to the buttons 11, 12, and 13, various operation buttons 29 such as those provided to a remote controller for operating a television or the like and a power supply switch 28, for example. Command signals generated when the user moves the input apparatus 1 in the air or operates the operation section 23 while holding the input apparatus 1 as shown in the figure are output to the control apparatus 40, and the control apparatus 40 controls the UI.

Typically, the MPU 19 of the input apparatus 1 generates, as the command, a movement command that corresponds to a displacement amount of the pointer 2 on the screen 3, the displacement amount corresponding to the detection signal from the sensor unit 17, and an operation command that corresponds to the operation signal input by the user via the operation section 23.

The operation signal input by the user via the operation section 23 is an input signal other than the detection signal of the sensor unit 17 as a signal related to a movement of the input apparatus 1 (casing 19), that is, an operation signal unrelated to the movement of the input apparatus 1.

Figure 7:
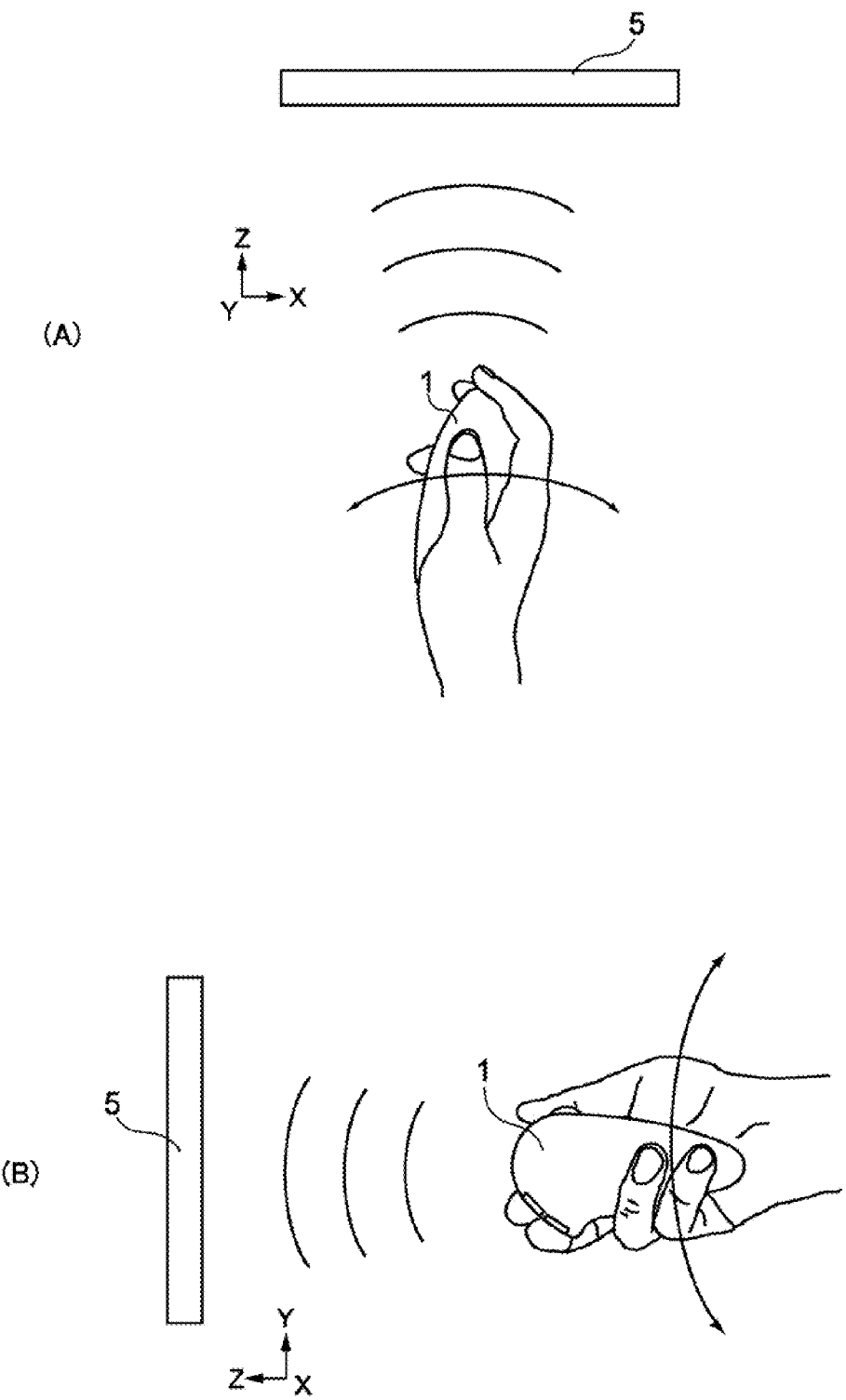
FIGS. 7 Explanatory diagrams showing typical examples of ways of moving the input apparatus and ways a pointer moves on the screen accordingly.

Next, a description will be given on typical examples of ways of moving the input apparatus 1 and ways the pointer 2 moves on the screen 3 accordingly. FIGS. 7 are explanatory diagrams therefor.

As shown in FIGS. 7(A) and 7(B), the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 of the sensor unit 17 (see FIG. 8) is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 7(A) and 7(B) will be referred to as reference position.

As shown in FIG. 7(A), in the reference position, the user swings a wrist or an arm in the lateral direction, that is, the yaw direction. At this time, the first acceleration sensor 161 detects an acceleration value $a_x$ in the X'-axis direction, and the first angular velocity sensor 151 detects an angular velocity value $\omega_\psi$ about the Y' axis. Based on those detection values, the control apparatus 40 controls display of the pointer 2 so that the pointer 2 moves in the X-axis direction.

Meanwhile, as shown in FIG. 7(B), in the reference position, the user swings the hand or the arm in the vertical direction, that is, the pitch direction. At this time, the second acceleration sensor 162 detects an acceleration value $a_y$ in the Y' axis direction, and the second angular velocity sensor 152 detects an angular velocity $\omega_\theta$ about the X' axis. Based on those detection values, the control apparatus 40 controls display of the pointer 2 so that the pointer 2 moves in the Y-axis direction.

Next, an operation of the input apparatus 1 will be described.

Figure 9:
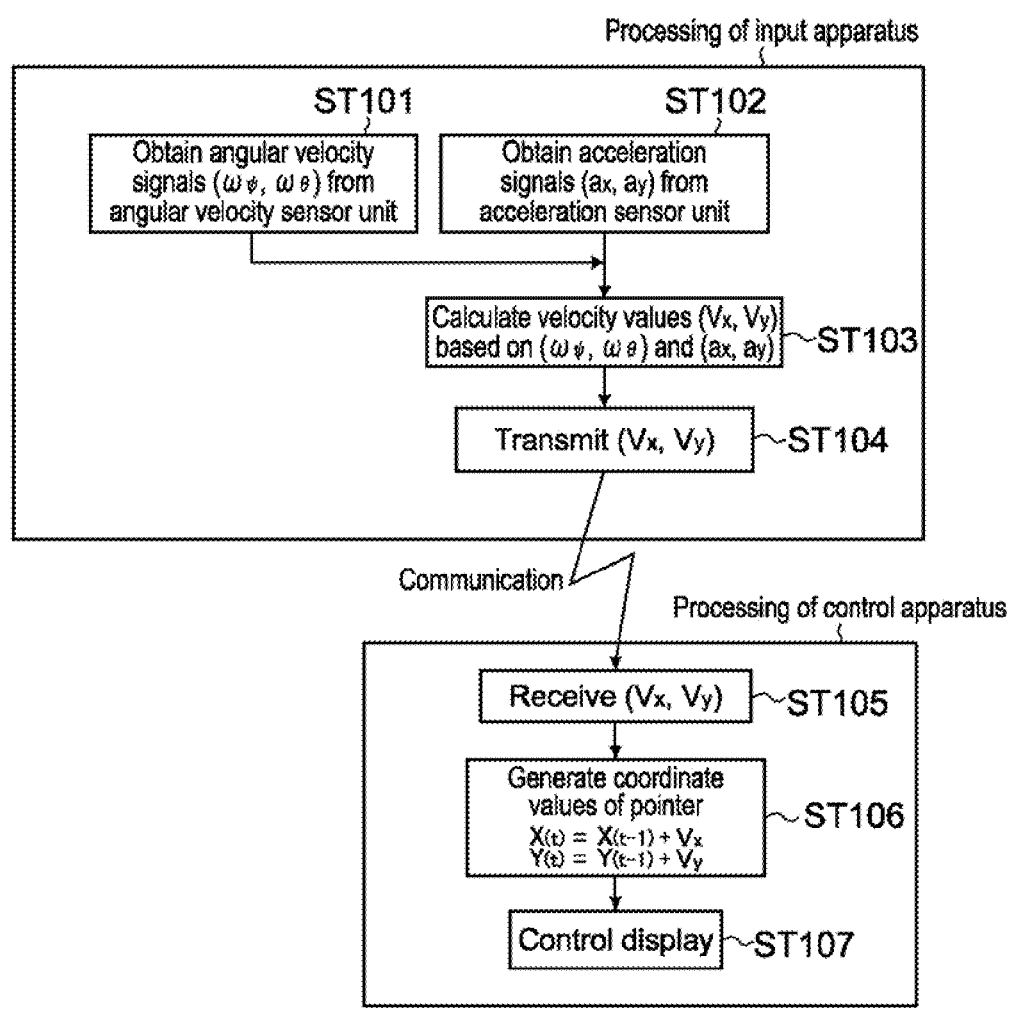
FIG. 9 A diagram for illustrating an operation of the control system 100 in a case where the pointer moves on the screen in accordance with a 3-dimensional operation by the user.

First, an operation of the control system 100 in a case where the pointer 2 is moved on the screen 3 in accordance with a 3-dimensional operation by the user will be described briefly. FIG. 9 is a flowchart showing the operation of the control system 100 in this case.

When the user presses the power supply switch 28 and the power of the input apparatus 1 is thus turned on, for example, biaxial angular velocity signals are output from the angular velocity sensor unit. The angular velocity values ($\omega_\psi$, $\omega_\theta$) obtained from the angular velocity signals are input to the MPU 19 (Step 101).

Further, upon turning on the power of the input apparatus 1, biaxial acceleration signals ($a_x$, $a_y$) are output from the acceleration sensor unit 16, and the biaxial acceleration values ($a_x$, $a_y$) are input to the MPU 19 (Step 102). It should be noted that the MPU 19 typically carries out the processes of Steps 101 and 102 in sync every predetermined clock cycle.

Based on the acceleration values ($a_x$, $a_y$) and the angular velocity values ($\omega_\psi$, $\omega_\theta$), the MPU 19 calculates velocity values ($V_x$, $V_y$) by a predetermined operation (Step 103). The velocity value $V_x$ is a velocity value in a direction along the X' axis, and the velocity value $V_y$ is a velocity value in a direction along the Y' axis.

As the method of calculating the velocity values ($V_x$, $V_y$), there is a method in which the MPU 19 calculates the velocity values by, for example, integrating the acceleration values ($a_x$, $a_y$) while using the angular velocity values ($\omega_\psi$, $\omega_\theta$) as an adjunct for the integration operation.

Alternatively, the MPU 19 may divide the acceleration values ($a_x$, $a_y$) by angular acceleration values ($\Delta\omega_\psi$, $\Delta\omega_\theta$) to thus obtain radius gyrations ($R_\psi$, $R_\theta$) of the movement of the input apparatus 1. In this case, the velocity values ($V_x$, $V_y$) can be calculated by multiplying the radius gyrations ($R_\psi$, $R_\theta$) by the angular velocity values ($\omega_\psi$, $\omega_\theta$). The radius gyrations ($R_\psi$, $R_\theta$) may also be obtained by dividing acceleration change rates ($\Delta a_x$, $\Delta a_y$) by angular acceleration change rates ($\Delta(\Delta\omega_\psi)$, $\Delta(\Delta\omega_\theta)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1. However, the velocity values ($V_x$, $V_y$) do not always need to be calculated by the calculation method above. For example, it is also possible for the velocity values ($V_x$, $V_y$) to be calculated by simply integrating the acceleration values ($a_x$, $a_y$).

Upon calculating the velocity values ($V_x$, $V_y$), the MPU 19 transmits, as the movement command, information on the calculated velocity values to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). In this case, the input apparatus 1 transmits the velocity values ($V_x$, $V_y$) every predetermined clocks, that is, every time a predetermined time passes, and the control apparatus 40 receives the velocity values every predetermined number of clocks.

Upon receiving the velocity values, the MPU 35 of the control apparatus 40 generates new coordinate values (X(t), Y(t)) by adding the velocity values to coordinate values using Equations (1) and (2) below (Step 106). Based on the generated coordinate values, the display control section 42 controls display so that the pointer 2 moves on the screen 3 (Step 107).

$$X(t) = X(t-1) + V_x \ldots \quad (1)$$

$$Y(t) = Y(t-1) + V_y \ldots \quad (2)$$

By such processing, the pointer 2 displayed on the screen 3 moves on the screen 3 in accordance with the 3-dimensional operation of the user.

It should be noted that the calculation of the velocity values ($V_x$, $V_y$) may be executed by the control apparatus 40. In this case, the input apparatus 1 transmits information on the angular velocity values ($\omega_\psi$, $\omega_\theta$) and the acceleration values ($a_x$, $a_y$) to the control apparatus 40 via the transceiver 21 and the antenna 22. Based on the information on the angular velocity values ($\omega_\psi$, $\omega_\theta$) and the acceleration values ($a_x$, $a_y$) received via the antenna 39 and the transceiver 38, the control apparatus 40 calculates the velocity values ($V_x$, $V_y$). The method of calculating the velocity values is as described above.

Figure 10:
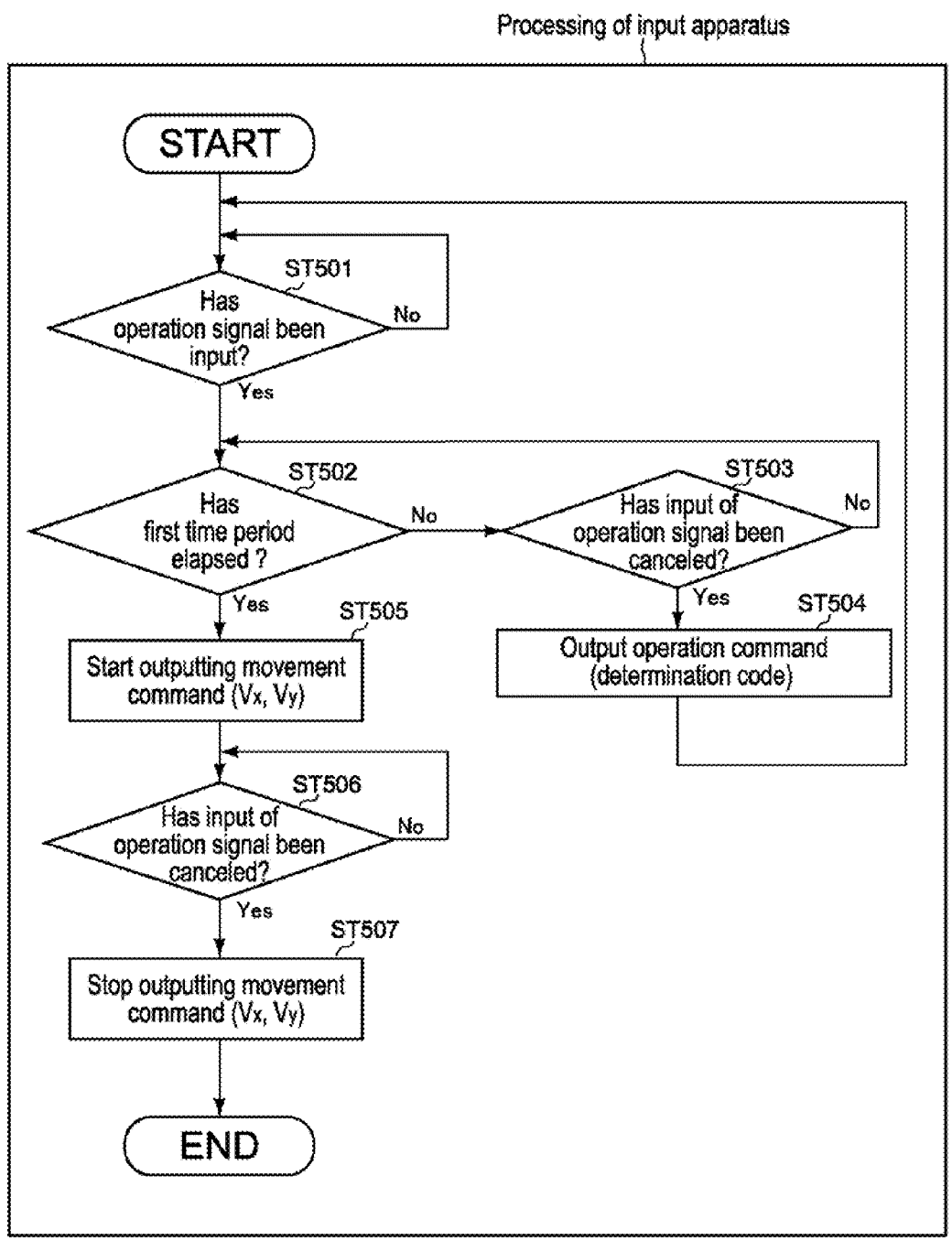
FIG. 10 A flowchart showing an operation in a case where an operation section of the input apparatus is operated by the user.

Next, an embodiment of an operation in a case where the operation section 23 of the input apparatus 1 is operated by the user will be described. FIG. 10 is a flowchart showing the operation. It should be noted that a description will be given on a case where the user operates the button 11 out of the operation section 23 to thus control the movement of the pointer 2, or clicks or double-clicks the icon 4 displayed on the screen 3.

Figure 11:
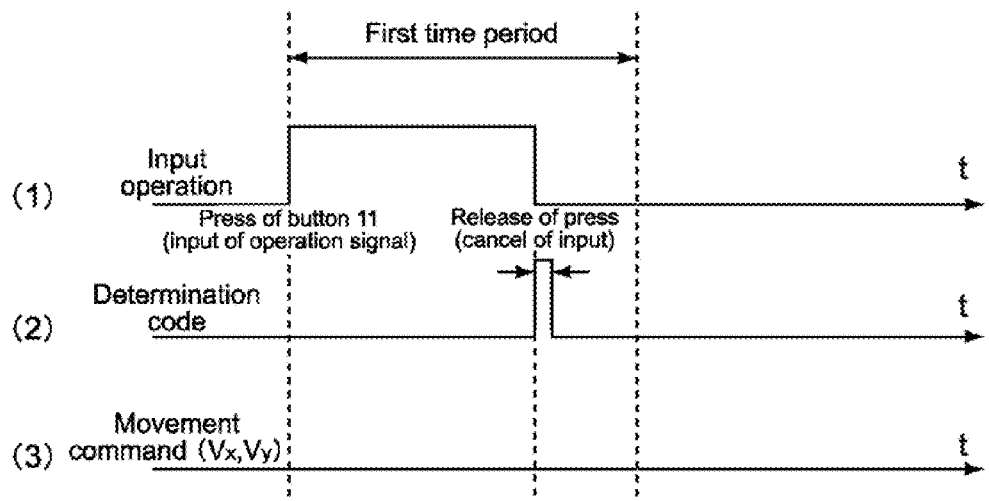
FIGS. 11 Timing charts for illustrating the operation shown in FIG. 10.
Figure 11:
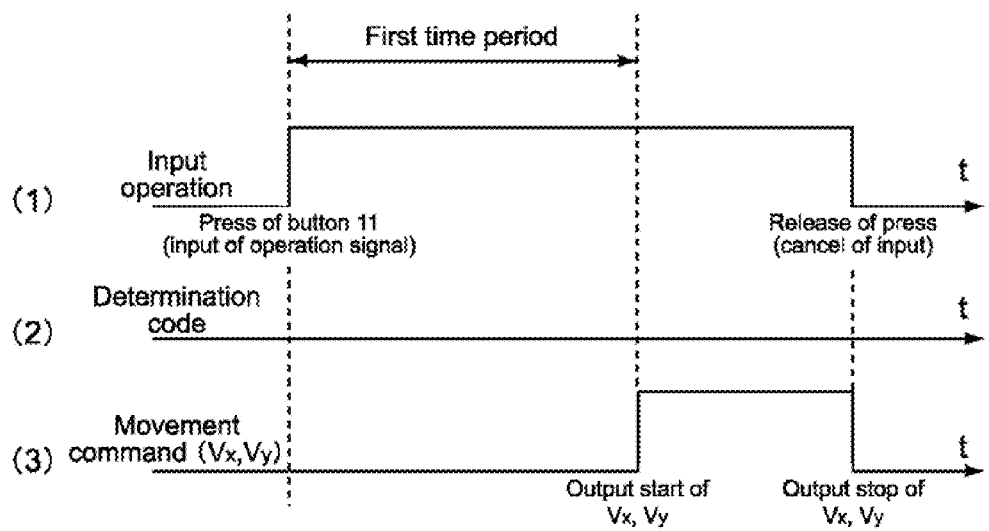

FIG. 11 are timing charts for illustrating the operation shown in FIG. 10. FIG. 11(A) is a diagram showing a case where the user has pressed the button 11 but the press is released within a first time period, and FIG. 11(B) is a diagram showing a case where the user has pressed and held the button 11 for a time period equal to or longer than the first time period.

Figure 12:
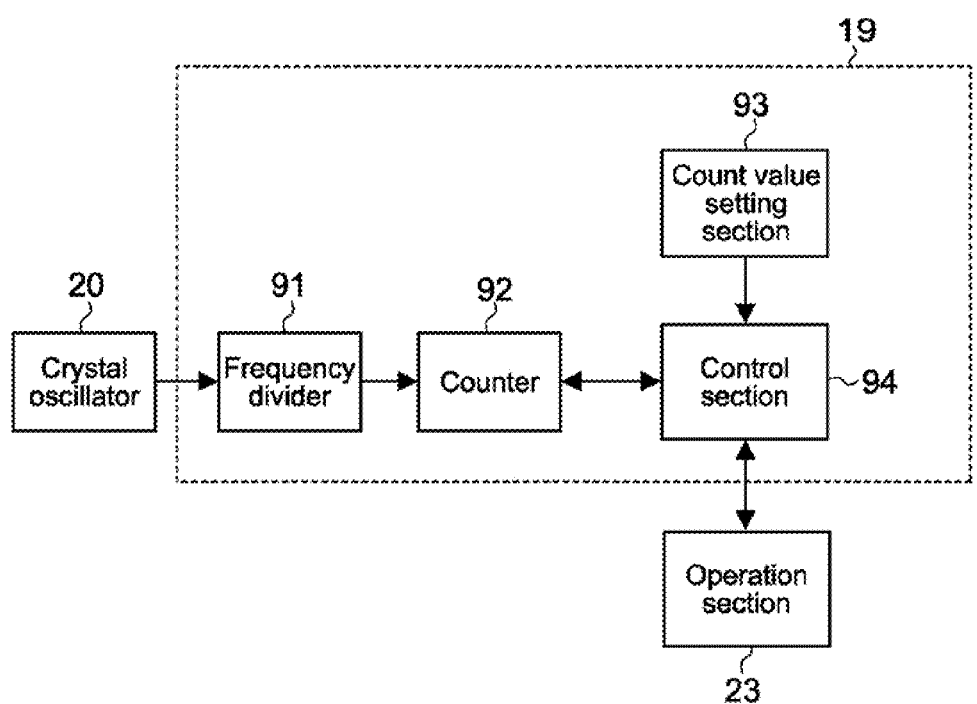
FIG. 12 A functional block diagram of the input apparatus for realizing the operation shown in FIG. 10.

FIG. 12 is a functional block diagram of the input apparatus for realizing the operation shown in FIG. 10. A frequency divider 91 generates clock pulses of a predetermined frequency based on the pulses supplied from the crystal oscillator 20. A counter 92 counts the clock pulses generated by the frequency divider 91. A count value setting section 93 stores a predetermined number of count values that have been set, for example. A control section 94 compares the count value supplied from the counter 92 and the count value supplied from the count value setting section 93 to execute processing to be described later.

Blocks of the frequency divider 91, the counter 92, the count value setting section 93, the control section 94, and the like are included in the MPU 19, for example. Instead of the MPU 19, those blocks may be included in a DSP, an FPGA, or the like.

A first count value that corresponds to the first time period is stored in advance in the count value setting section 93. Here, the first time period is a time period corresponding to a time period from a start of the input of the operation signal from the button 11 to the output of the movement command, that is, a time period from the start of the press of the button 11 to the start of the movement of the pointer 2.

The first time period is typically a time period of 0.2 to 0.4 sec, but is not limited thereto. The first time period may be 0.2 sec or less or 0.4 sec or more.

It is also possible to allow the user to customize the first time period. For realizing such customization by the user, the input apparatus 1 may be provided with, for example, a DIP switch or a variable resistor. Further, it is also possible to allow the user to perform customization by operating a GUI on the screen 3 by operating the input apparatus 1 and the operation section 23. The same holds true for a second time period to be described later.

By allowing the first time period to be customized as described above, the user can arbitrarily set a time period that matches his/her own operational feeling, with the result that an operational feeling of the input to the button 11 can be improved.

In a state where an control signal is not input by the user via the button 11 (NO in Step 501), an output of the velocity values ($V_x$, $V_y$) as the movement command from the MPU 19 is stopped, or a movement command with the displacement amount of the pointer 2 set to 0 (($V_x$, $V_y$)=(0, 0)) is output (output control means). In other words, the pointer 2 does not move on the screen 3 even when the user holds the input apparatus 1 and moves it.

When the button 11 is pressed and the operation signal is thus input (YES in Step 501), the control section 94 turns on a timer and starts counting up with the counter 92. The control section 94 compares the count value supplied from the counter 92 and the first count value stored in the count value setting section 93, to thus judge whether the first time period has elapsed since the input of the operation signal (Step 502).

Moreover, the control section 94 judges whether the press of the button 11 has been released within the first time period since the input of the operation signal and the input of the operation signal has thus been canceled (Step 503).

When the press of the button 11 is released within the first time period and the input of the operation signal is thus canceled (YES in Step 503), that is, when a click operation is made by the user, the control section 94 ends the timer and the MPU 19 outputs a determination code as the operation command (Step 504). In this case, as shown in FIG. 11(A)(2), the MPU 19 outputs the determination code from after the release of the press of the button 11. The determination code is generated as a short-term pulse signal, for example. It should be noted that when the user releases the press of the button 11 within the first time period, the velocity values ($V_x$, $V_y$) are not output as shown in FIG. 11(A)(3), or velocity values are output as 0.

Upon being input with the determination code output from the input apparatus 1, the control apparatus 40 executes predetermined processing. For example, if the pointer 2 is placed on the icon 4 on the screen 3 when the button 11 is pressed, the MPU 35 of the control apparatus 40 executes processing of selecting that icon 4 or activates an application program corresponding to that icon 4. When the pointer 2 is not placed on the icon 4 when the button 11 is pressed, the control apparatus 40 executes other predetermined processing.

When the user presses the button 11 and releases it within the first time period (Step 501 to YES in Step 503) and repeats this operation, the determination code is output twice. It is also possible for the MPU 35 of the control apparatus 40 to execute processing corresponding to a double-click when, after the input of the determination code, the determination code is re-input within a predetermined time period.

When the input of the operation signal is not canceled within the first time period since the input of the operation signal, that is, when the user press-and-holds the button 11 (YES in Step 502), the MPU 19 starts outputting the velocity values ($V_x$, $V_y$) from after an elapse of the first time period (Step 505) (see FIG. 11(B)(3)). In this case, the control section 94 ends the timer when the count value supplied from the counter 92 and the first count value stored in the count value setting section 93 match.

Upon start of the output of the velocity values ($V_x$, $V_y$) as the movement command, the MPU 19 judges whether the press of the button 11 has been released and the input of the operation signal has thus been canceled (Step 506). When the input of the operation signal is canceled (YES in Step 506), the MPU 19 stops outputting the velocity values ($V_x$, $V_y$) (Step 507) (see FIG. 11(B)(3)). Alternatively, the MPU 19 starts outputting the movement command with the velocity values set to 0.

It should be noted that when the user press-and-holds the button 11 for a time period equal to or longer than the first time period, the determination code is not output as shown in FIG. 11(B)(2).

The operation shown in FIG. 10 thus provides the button 11 with a function corresponding to a left button of a mouse (determination input button) and a function corresponding to a dedicated input button (movement control button) for controlling a movement and stop of a pointer, for example. When the press is started and the press is released within the first time period, the button 11 exerts the function corresponding to a left button of a mouse, for example. On the other hand, when the button 11 is pressed and held for a time period equal to or longer than the first time period, the button 11 exerts the function corresponding to a dedicated input button for controlling a movement and stop of a pointer.

By operating the button 11 as the operation section 23 of the input apparatus 1, the user can perform inputs of selection, execution, and the like of the icon 4, and perform inputs for moving and stopping the pointer 2. Accordingly, the input operation for moving and stopping the pointer is not mixed up with other input operations, with the result that the user can easily control the movement and stop of the pointer.

Moreover, the input apparatus 1 of this embodiment does not output the velocity values ($V_x$, $V_y$) when the press of the button 11 is released within the first time period since the press of the button 11 (Step 501 to YES in Step 503) (see FIG. 11(A)(3)) Alternatively, a movement command with the velocity values set to 0 is output. Therefore, even if the user clicks or double-clicks the button 11 when the pointer 2 is placed on the icon 4, the pointer 2 is kept placed on the icon 4.

As a result, processing unintended by the user can be prevented from being executed on the screen 3 due to the pointer 2 being moved from the icon 4 by a tilt of the input apparatus 1 caused by an operation when the user presses or releases the button 11, for example.

The processing shown in FIG. 10 may be mainly executed by the control apparatus 40. In this case, the control apparatus 40 receives the information on the velocity values ($V_x$, $V_y$) transmitted from the input apparatus 1 and receives the operation signal input via the operation section 23 (reception means). The MPU 35 of the control apparatus 40 is input with the operation signal via the transceiver 38, and the MPU 35 judges whether the input of the operation signal is canceled within the first time period. When the input of the operation signal is canceled within the first time period, predetermined processing is executed in response to the operation signal. On the other hand, when the input of the operation signal is not canceled within the first time period, control is performed so that the pointer 2 moves on the screen 3 in accordance with the velocity values ($V_x$, $V_y$) after the elapse of the first time period. It should be noted that in this case, the calculation of the velocity values ($V_x$, $V_y$) may be executed by the control apparatus 40.

Next, an embodiment for realizing a drag operation will be described.

In general, press-and-hold of a left button and right button of a planar-operation-type mouse is allocated with a drag function. However, in the embodiment shown in FIGS. 10 and 11, the function as the movement control button has been allocated to the press of the button 11 for a time period equal to or longer than the first time period (press-and-hold) as described above. For realizing the drag operation using the input apparatus 1, it is necessary to allocate a drag function to an operation method of the button 11 other than the press-and-hold. In this regard, in this and subsequent embodiments, the drag function is allocated to the press-and-hold after the click, to thus realize the drag operation on the screen 3.

Figure 13:
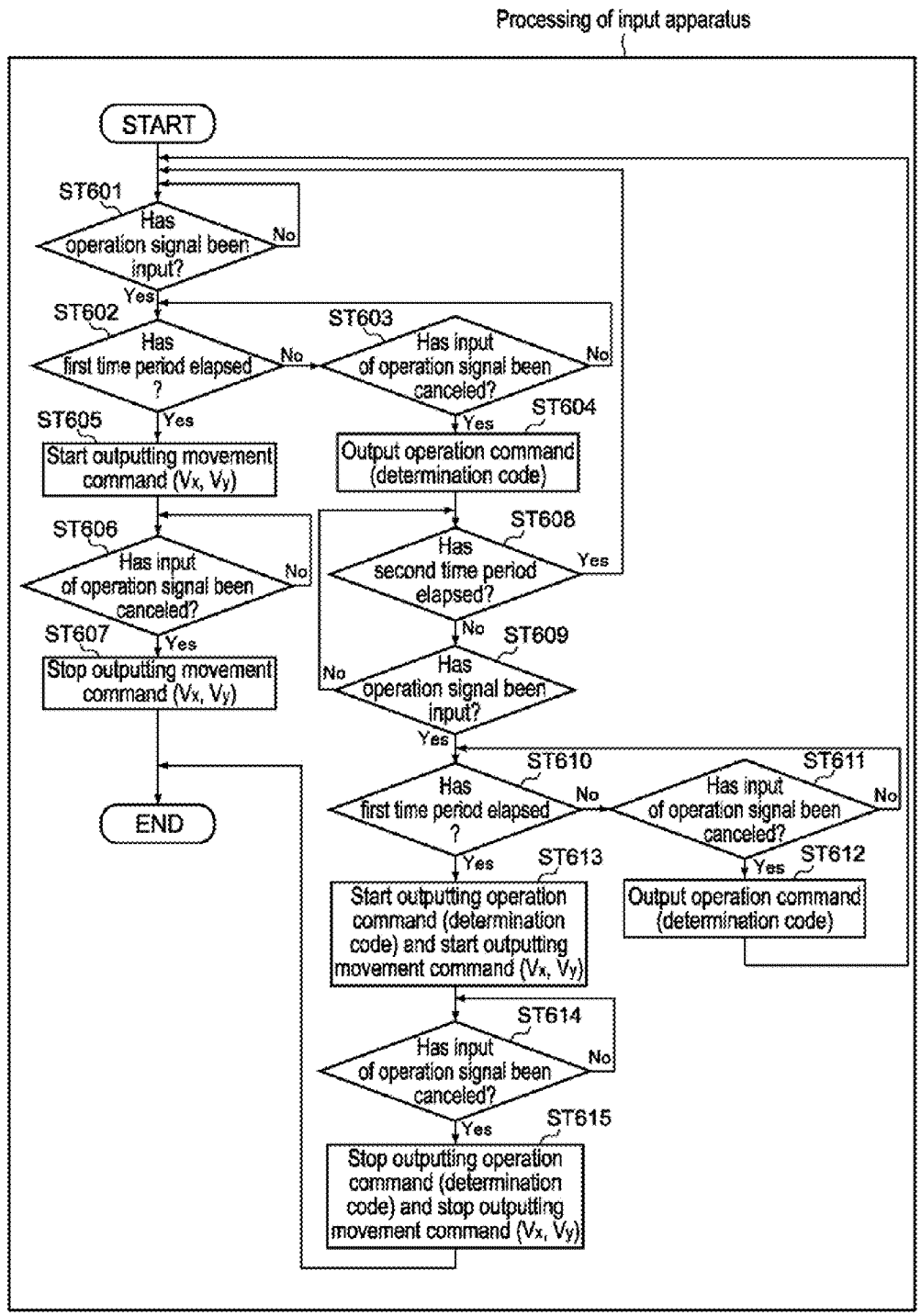
FIG. 13 A flowchart according to an embodiment for realizing a drag operation.
Figure 14:
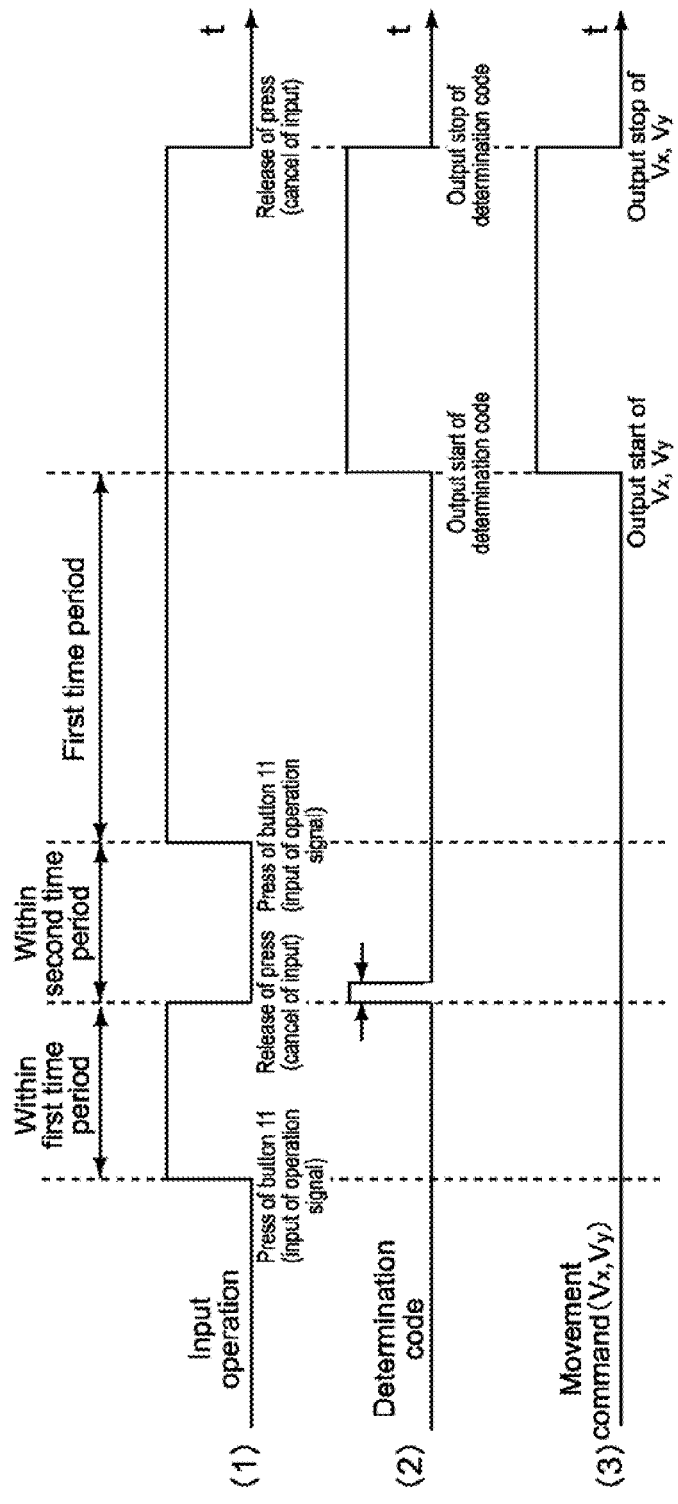
FIG. 14 A timing chart for illustrating the operation shown in FIG. 13.

FIG. 13 is a flowchart showing an operation of the input apparatus 1 according to this embodiment. FIG. 14 is a timing chart for illustrating the operation shown in FIG. 13 and shows a case where, after the user has pressed and released the button 11 within the first time period, the button 11 is re-pressed within the second time period and pressed and held for a time period equal to or longer than the first time period. It should be noted that in this embodiment, points different from those of the embodiment shown in FIG. 10 above will mainly be described.

A second count value corresponding to the second time period is stored in advance in the count value setting section 93. Here, the second time period is a time period from the cancel of the input of the operation signal from the button 11. The second time period may be the same as the first time period described above, or may be different.

As shown in FIG. 13, when the button 11 is pressed, the MPU 19 of the input apparatus 1 is input with an operation signal (YES in Step 601), and the MPU 19 judges whether the first time period has elapsed (Step 602).

When the input of the operation signal is canceled within the first time period (YES in Step 603), the MPU 19 outputs a determination code (Step 604) (see FIG. 14(2)). Then, the control section 94 resets the timer and judges whether the second time period has elapsed since the cancel of the input of the operation signal (Step 608). In this case, the control section 94 compares the count value from the counter 92 and the second count value stored in the count value setting section 93 to thus judge whether the second time period has elapsed since the cancel of the input of the operation signal.

The control section 94 judges whether the button 11 has been re-pressed within the second time period and the operation signal has thus been re-input (Step 609).

When the operation signal is not re-input within the second time period (YES in Step 608), the control section 94 ends the timer and again judges whether the operation signal has been input (Step 601).

On the other hand, when the user re-presses the button 11 within the second time period and the operation signal is thus re-input (YES in Step 609), the control section 94 resets the timer and judges whether the first time period has elapsed since the input of the operation signal (Step 610).

The control section 94 judges whether the input of the operation signal has been canceled within the first time period (Step 611). When the input of the operation signal is canceled within the first time period (YES in Step 611), the MPU 19 outputs a determination code (Step 612). Then, a judgment is made again on whether the operation signal has been input (Step 601).

It is also possible that, when the determination code is output from the MPU 19 in Step 612, the MPU 35 of the control apparatus 40 execute processing corresponding to a double-click based on the determination code output in Step 612 and the determination code output in Step 604.

On the other hand, when the input of the operation signal is not canceled within the first time period (YES in Step 610), that is, when the user press-and-holds the button 11, the MPU 19 starts outputting the velocity values ($V_x$, $V_y$) and starts outputting the determination code (Step 613) (see FIGS. 14(2) and (3)).

In this case, the control apparatus 40 receives the velocity values ($V_x$, $V_y$) and the determination code output from the input apparatus 1 in parallel. When the velocity values and the determination code are input in parallel, the MPU 35 of the control apparatus 40 generates (X(t), Y(t)) in accordance with the velocity values ($V_x$, $V_y$). Then, when the pointer 2 is placed on the icon 4, control is performed so that the pointer 2 and the icon 4 move on the screen 3 in accordance with the coordinate values coordinate values (X(t), Y(t)). In other words, the MPU 35 of the control apparatus 40 controls the display of the drag operation in a case where the velocity values and the determination code are input in parallel.

Upon start of the output of the velocity values ($V_x$, $V_y$) and the determination code, the MPU 19 of the input apparatus 1 judges whether the press of the button 11 has been released and the input of the operation signal has thus been canceled (Step 614). When the input of the operation signal is canceled (YES in Step 614), the MPU 19 stops outputting the velocity values ($V_x$, $V_y$) and the determination code (Step 615) (see FIGS. 14(2) and (3)).

The drag operation on the screen 3 can be realized by the operation as shown in FIG. 13.

In the above description, the case where, when the input of the operation signal is canceled within the first time period, the determination code is output immediately after the input of the operation signal has been described (Steps 604 and 612, see FIGS. 14(1) and (2)). However, the present invention is not limited thereto, and the MPU 19 may output, in a case where the input of the operation signal is canceled within the first time period, the determination code when the operation signal is not input within the second time period since the cancel.

Further, also in this embodiment, the processing shown in FIG. 13 may mainly be executed by the control apparatus 40.

Next, another embodiment for realizing the drag operation will be described. In this embodiment, the drag operation is realized on the screen 3 by the input apparatus 1 judging the elapse of the first time period as a time period from the start of the press of the button 11 and the control apparatus 40 judging the elapse of the second time period as a time period from the release of the press of the button 11.

Figure 15:
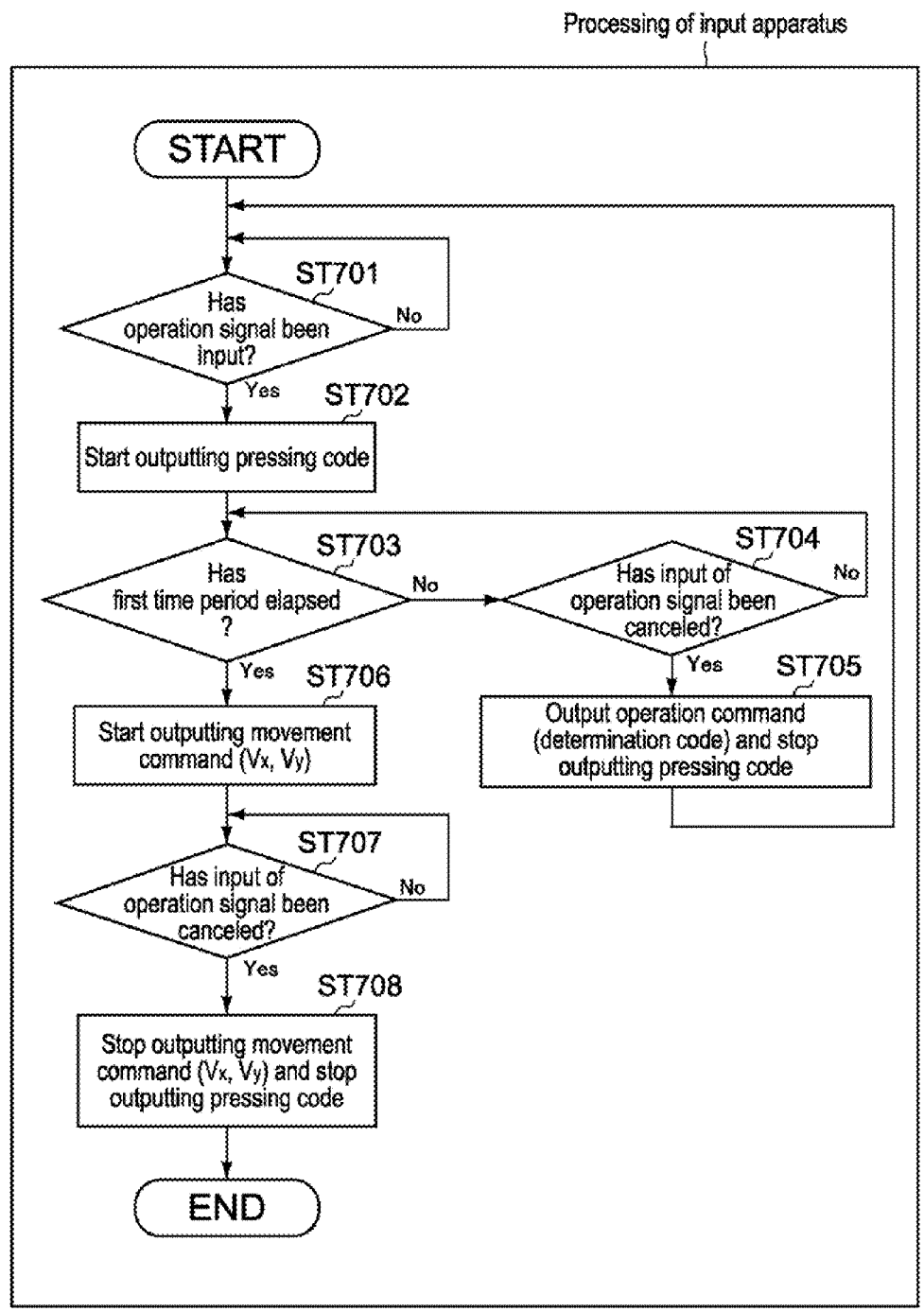
FIG. 15 A flowchart showing another embodiment for realizing the drag operation, the flowchart showing an operation on the input apparatus side.
Figure 16:
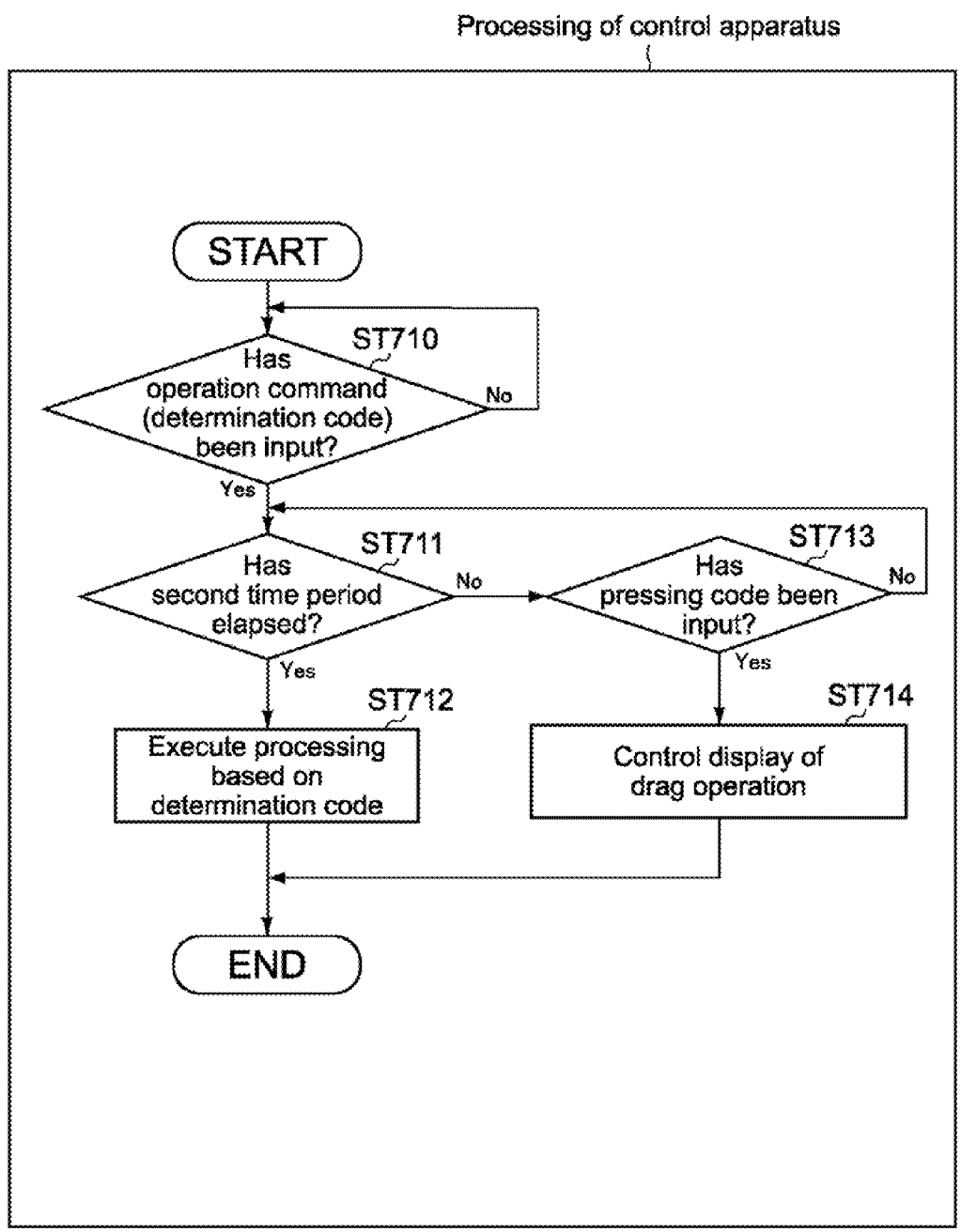
FIG. 16 A flowchart showing an operation on a control apparatus side.
Figure 17:
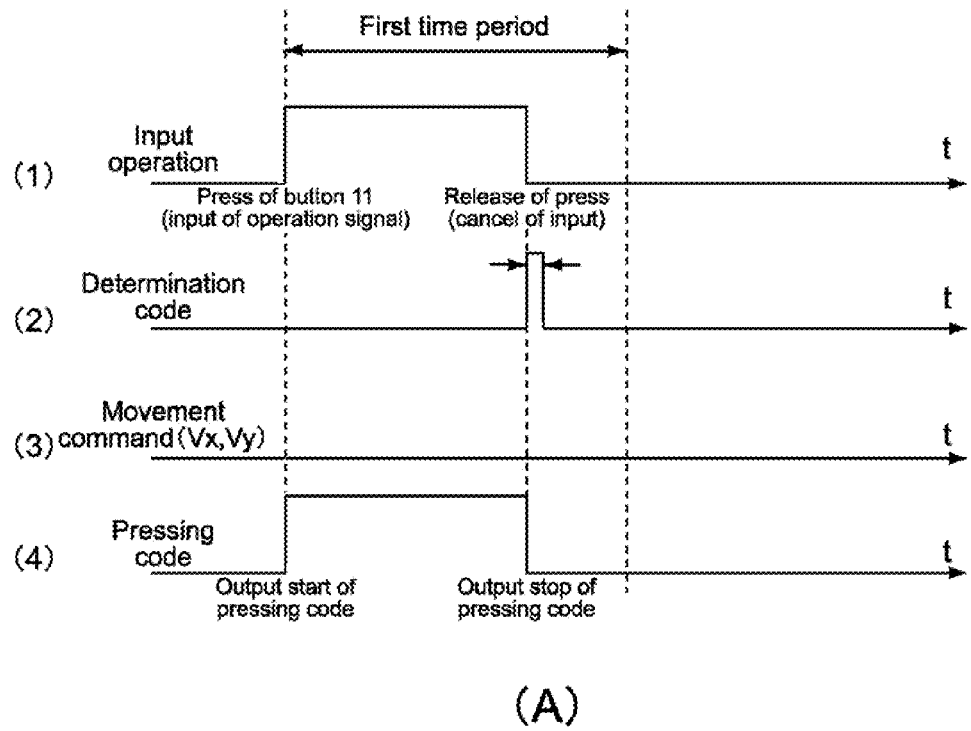
FIGS. 17 Timing charts for illustrating the operation shown in FIG. 15.
Figure 17:
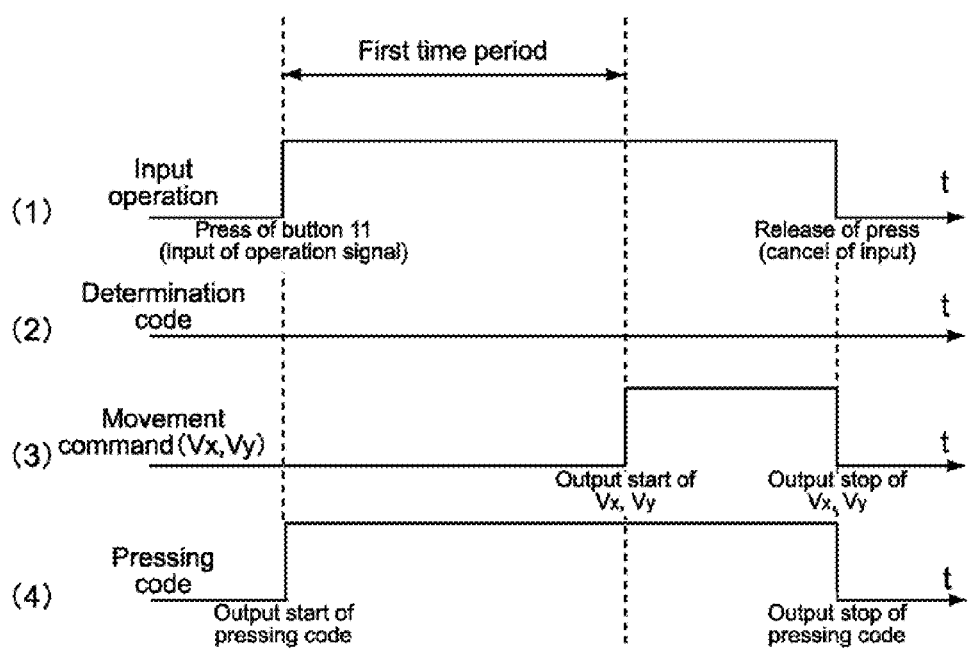

FIG. 15 is a flowchart showing an operation on the input apparatus 1 side. FIG. 16 is a flowchart showing an operation on the control apparatus side. FIGS. 17 are timing charts for illustrating the operation shown in FIG. 15. FIG. 17(A) is a diagram showing a case where the user has pressed the button 11 and the press is released within the first time period, and FIG. 17(B) is a diagram showing a case where the user has pressed and held the button 11 for a time period equal to or longer than the first time period.

As shown in FIG. 15, when the button 11 is pressed by the user and the operation signal is thus input to the control section 94 (YES in Step 701), the MPU 19 of the input apparatus 1 starts outputting a pressing code (pressing signal) via the transceiver 21 and the antenna 22 (Step 702) (see FIG. 17(A)(4) and FIG. 17(B)(4)).

The control section 94 judges whether the input of the operation signal has been canceled within the first time period since the input of the operation signal (Step 704). When the input of the operation signal is canceled within the first time period (YES in Step 704), the MPU 19 outputs a determination code via the transceiver 21 and the antenna 22 and stops outputting the pressing code (Step 705) (see FIG. 17(A)(2) and FIG. 17(A)(4)).

On the other hand, when the input of the operation signal is not canceled, that is, the first time period has elapsed while the button 11 is pressed (YES in Step 703), the output of the velocity values ($V_x$, $V_y$) is started (Step 706) (see FIG. 17(B)(3)). Upon start of the output of the velocity values, a judgment is made on whether the input of the operation signal has been canceled (Step 707). When the press of the button 11 is released and the input of the operation signal is thus canceled (YES in Step 707), the output of the velocity values is stopped and the output of the pressing code is stopped (Step 708) (see FIG. 17(B)(3) and FIG. 17(B)(4)).

In other words, in the flowchart shown in FIG. 15, the MPU 19 outputs the pressing code via the transceiver 21 and the antenna 22 from when the button 11 is pressed to when the press is released.

As shown in FIG. 16, the MPU 35 of the control apparatus 40 monitors whether the determination code is input (Step 710).

When the user presses the button 11 and releases the press within the first time period, the determination code is output from the input apparatus 1 side (FIG. 15, Step 705) to be input to the MPU 35 of the control apparatus 40 (FIG. 16, YES in Step 710). Upon being input with the determination code, the MPU 35 judges whether the second time period has elapsed since the input of the determination code (Step 711).

The judgment on whether the second time period has elapsed may be carried out by, for example, the MPU 35 of the control apparatus 40 comparing the second count value stored in the count value setting section 93 with the count value from the counter 92 with the structure as shown in FIG. 12, or by other methods.

The MPU 35 judges whether the pressing code has been input within the second time period (Step 713). When the second time period has elapsed without the pressing code being input (YES in Step 711), the MPU 35 executes predetermined processing based on the determination code input in Step 710 (Step 712).

On the other hand, when the pressing code is input within the second time period since the input of the determination code (YES in Step 713), that is, when the user presses and releases the button 11 within the first time period and re-presses the button 11 within the second time period thereafter, the MPU 35 of the control apparatus 40 controls display of the drag operation on the screen 3 (Step 714).

In this case, by the re-pressed button 11 being pressed and held for a time period equal to or longer than the first time period, the velocity values ($V_x$, $V_y$) output from the input apparatus 1 side in Steps 706 to 708 in FIG. 15 are integrated to thus generate coordinate values X(t) and Y(t). Thus, the pointer 2 and the icon 4 move on the screen 3.

By the operations shown in FIGS. 15 and 16, the display of the drag operation on the screen 3 is realized.

In this embodiment, because the input apparatus 1 starts outputting the pressing code when the user starts pressing the button 11 (see FIG. 17(A)(4) and FIG. 17(B)(4)), the control apparatus 40 can recognize the start of the input from the button 11 by the user. Accordingly, the control apparatus 40 can judge whether the press of the button 11 has been started again within the second time period since the release of the press of the button 11.

It should be noted that the determination code is output when the press of the button 11 is released (see FIG. 17(A)(2)), and the movement command is started to be output after an elapse of the first time period since the press of the button 11 (see FIG. 17(B)(3)). Therefore, the control apparatus 40 cannot recognize the start of the press of the button 11 with the determination code and the movement command.

In the processing shown in FIGS. 15 and 16, the drag operation has been realized by outputting the pressing code on the input apparatus 1 side and judging the input of the pressing code on the control apparatus 40 side. However, it is also possible to realize the drag operation without using the pressing code.

Figure 18:
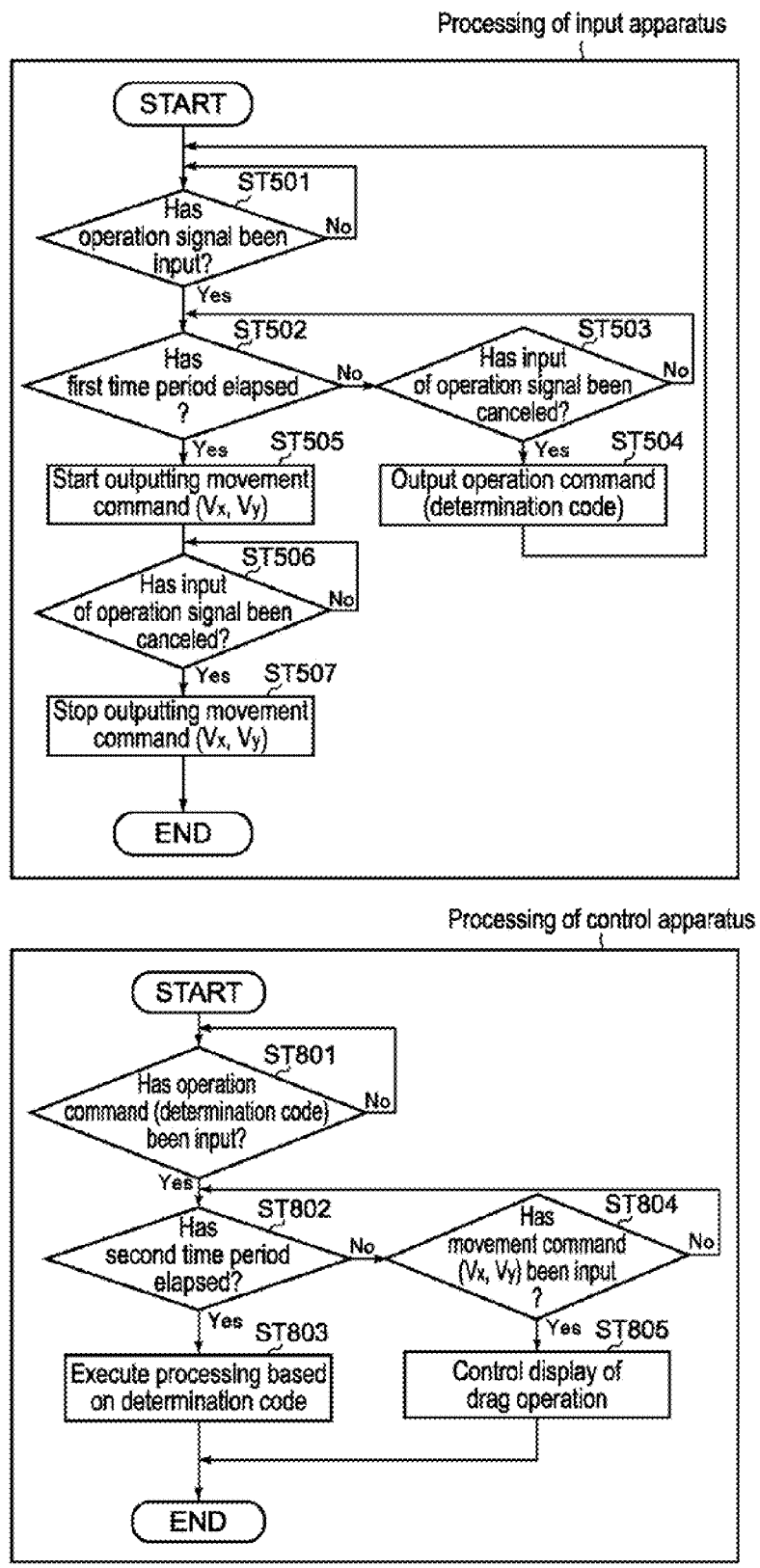
FIG. 18 A flowchart showing an operation according to still another embodiment for realizing the drag operation.

FIG. 18 is a diagram showing processing of the input apparatus 1 and processing of the control apparatus 40 for realizing the drag operation without using the pressing code. In this case, the input apparatus 1 carries out the same operation as the flowchart shown in FIG. 10.

As shown in FIG. 18, when the user presses the button 11 and releases the press within the first time period, a determination code is output from the input apparatus 1 (Steps 501 to 504). The determination code output from the input apparatus 1 is input to the MPU 35 of the control apparatus 40 (YES in Step 801). The MPU 35 of the control apparatus 40 judges whether the second time period has elapsed since the input of the determination code (Step 802).

When the user re-presses the button 11 and holds the press for a time period equal to or longer than the first time period (Step 501 to YES in Step 502), the velocity values of the input apparatus 1 are started to be output (Step 505). The velocity values are input to the MPU 35 of the control apparatus 40. When the velocity values are input within the second time period since the input of the determination code (YES in Step 804), the MPU 35 integrates the velocity values to generate coordinate values X(t) and Y(t), and performs control so as to move the pointer 2 and the icon 4 on the screen 3 (Step 805).

The display of the drag operation on the screen 3 is realized as described above.

The control system described heretofore is not limited to the above embodiments, and various modifications can be made.

Figure 19:
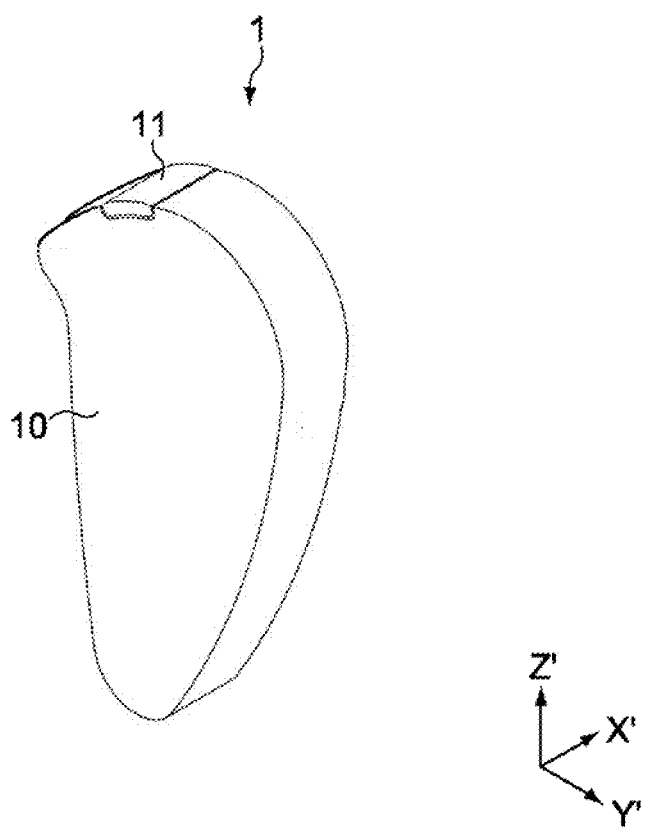
FIG. 19 A diagram showing an input apparatus including one operation section.

The above embodiments have been described assuming that the input apparatus 1 includes, as the operation section 23, the buttons 12, 13, and the like in addition to the button 11 (see FIG. 2). However, the input apparatus 1 may include the button 11 alone. In other words, as described above, because the button 11 of the input apparatus 1 according to the above embodiments includes various functions (movement control of pointer, determination, and drag), other operation sections 23 can be omitted. Accordingly, costs and size of the input apparatus can be reduced, and a simple and neat design can be realized. As a reference, FIG. 19 shows the input apparatus 1 that includes the button 11 alone.

The above embodiments have been described assuming that the input apparatus 1 is operated 3-dimensionally, but it is also possible to operate the input apparatus 1 on a plane (e.g., on a table).

In the above embodiments, input information has been transmitted to the control apparatus wirelessly. However, the input information may be transmitted by wire.

The embodiments may be applied to, for example, a handheld-type information processing apparatus (handheld apparatus) including a display section. In this case, by the user moving a main body of the handheld apparatus, a pointer displayed on the display section is moved. Examples of the handheld apparatus include a PDA (Personal Digital Assistance), a cellular phone, a portable music player, and a digital camera.

In the above embodiments, the pointer 2 that moves on the screen 3 in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

In the above embodiments, the input apparatus 1 has been structured to detect acceleration values in two directions and angular velocity values about two axes. However, the embodiments are is not limited thereto, and a structure that detects an acceleration value in a single direction and an angular velocity value about a single axis or a structure that detects acceleration values in three directions and angular velocity values about three axes may be employed instead. Alternatively, the processing shown in FIGS. 10 to 18 can be executed even with the structure that detects only the acceleration value in a single direction or only the angular velocity value in a single direction.

Instead of the angular velocity sensor unit 15 for detecting angular velocity values, an angle sensor such as a magnetic sensor or an angular acceleration sensor may be used. It is also possible to structure at least one of the acceleration sensor unit 16 and the angular velocity sensor unit 15 by an image sensor such as a CCD sensor or a CMOS sensor.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An input apparatus outputting a command for controlling a movement of an image displayed on a screen, the input apparatus comprising:
   a casing;
   a sensor to detect a 3-dimensional movement of the casing and output a detection signal corresponding to the movement of the casing;
   an operation section to input an operation signal with respect to the input apparatus that is unrelated to the movement of the casing;
   an output means for outputting a movement command that corresponds to a displacement amount of the image on the screen, the displacement amount corresponding to the detection signal, and an operation command that corresponds to the operation signal input via the operation section; and
   an output control means for controlling the output means to output, when the input of the operation signal is not canceled within a first time period, the movement command from after an elapse of the first time period until the input of the operation signal is canceled, and output the operation command when the input of the operation signal is canceled within the first time period.

2. The input apparatus according to claim 1,
   wherein the output control means controls the output means to output, when the operation signal is re-input within a second time period since the cancel of the input of the operation signal within the first time period but the input of the operation signal is not canceled within the first time period, the movement command and the operation command from after the elapse of the first time period until the input of the operation signal is canceled.

3. The input apparatus according to claim 2,
   wherein the output control means controls the output means to output the operation command when the operation signal is not re-input within the second time period since the cancel of the input of the operation signal within the first time period.

4. The input apparatus according to claim 1, further comprising
   a variable means for varying the first time period.

5. An input apparatus outputting a command for controlling a movement of an image displayed on a screen to a control apparatus to control display of the screen, the input apparatus comprising:
   a casing;
   a sensor to detect a 3-dimensional movement of the casing and output a detection signal corresponding to the movement of the casing;
   one operation section to input an operation signal with respect to the input apparatus that is unrelated to the movement of the casing;
   an output means for outputting a movement command that corresponds to a displacement amount of the image on the screen, the displacement amount corresponding to the detection signal, and an operation command that corresponds to the operation signal input via the operation section; and
   an output control means for controlling an output timing of the movement command and the operation command in accordance with an input timing of the output operation signal, for causing the control apparatus to control display of the movement of the image, execution of predetermined processing, or display of a drag operation of the image;
   wherein the output control means for controlling the output means to output, when the input of the operation signal is not canceled within a first time period, the movement command from after an elapse of the first time period until the input of the operation signal is canceled, and output the operation command when the input of the operation signal is canceled within the first time period.

6. A control apparatus controlling display of a movement of an image on a screen in accordance with a movement command and an operation command output from an input apparatus, the control apparatus comprising:
   a reception means for receiving the movement command and the operation command output from the input apparatus, the input apparatus including a casing, a sensor to detect a 3-dimensional movement of the casing and output a detection signal corresponding to the movement of the casing, an operation section to input an operation signal with respect to the input apparatus that is unrelated to the movement of the casing, an output means for outputting the movement command that corresponds to a displacement amount of the image on the screen, the displacement amount corresponding to the detection signal, and the operation command that corresponds to the operation signal input via the operation section, and an output control means for controlling the output means to output, when the input of the operation signal is not canceled within a first time period, the movement command from after an elapse of the first time period until the input of the operation signal is canceled, output the operation command when the input of the operation signal is canceled within the first time period, and output, when the operation signal is re-input within a second time period since the cancel of the input of the operation signal within the first time period but the input of the operation signal is not canceled within the first time period, the movement command and the operation command from after the elapse of the first time period until the input of the operation signal is canceled; and a processing means for controlling the display of the movement of the image in accordance with the movement command when the movement command is input via the reception means, executing predetermined processing in accordance with the operation command when the operation command is input, and controlling display of drag of the image when both the movement command and the operation command are input.

7. A control apparatus controlling display of a movement of an image on a screen in accordance with a movement command and an operation command output from an input apparatus, the control apparatus comprising:

a reception means for receiving the movement command and the operation command output from the input apparatus, the input apparatus including a casing, a sensor to detect a 3-dimensional movement of the casing and output a detection signal corresponding to the movement of the casing, one operation section to input an operation signal with respect to the input apparatus that is unrelated to the movement of the casing, an output means for outputting the movement command that corresponds to a displacement amount of the image on the screen, the displacement amount corresponding to the detection signal, and the operation command that corresponds to the operation signal input via the operation section, and an output control means for controlling an output timing of the movement command and the operation command in accordance with an input timing of the output operation signal; and a processing means for controlling the display of the movement of the image, execution of predetermined processing, or display of a drag operation of the image in accordance with an input timing of the movement command and the operation command input via the reception means;

wherein the output control means for controlling the output means to output, when the input of the operation signal is not canceled within a first time period, the movement command from after an elapse of the first time period until the input of the operation signal is canceled, and output the operation command when the input of the operation signal is canceled within the first time period.

8. A control system controlling a movement of an image displayed on a screen, the control system comprising:

an input apparatus including a casing, a sensor to detect a 3-dimensional movement of the casing and output a detection signal corresponding to the movement of the casing, an operation section to input an operation signal with respect to the input apparatus that is unrelated to the movement of the casing, an output means for outputting a movement command that corresponds to a displacement amount of the image on the screen, the displacement amount corresponding to the detection signal, and an operation command that corresponds to the operation signal input via the operation section, and an output control means for controlling the output means to output, when the input of the operation signal is not canceled within a first time period, the movement command from after an elapse of the first time period until the input of the operation signal is canceled, and output the operation command when the input of the operation signal is canceled within the first time period; and a control apparatus including a reception means for receiving the movement command and the operation command output from the input apparatus, and a processing means for controlling a movement of a pointer displayed on the screen in accordance with the movement command input via the reception means, and executing predetermined processing in accordance with the operation command input via the reception means.

9. A control system controlling a movement of an image displayed on a screen, the control system comprising:

an input apparatus including a casing, a sensor to detect a 3-dimensional movement of the casing and output a detection signal corresponding to the movement of the casing, one operation section to input an operation signal with respect to the input apparatus that is unrelated to the movement of the casing, an output means for outputting a movement command that corresponds to a displacement amount of the image on the screen, the displacement amount corresponding to the detection signal, and an operation command that corresponds to the operation signal input via the operation section, and an output control means for controlling an output timing of the movement command and the operation command in accordance with an input timing of the operation signal;

wherein the output control means for controlling the output means to output, when the input of the operation signal is not canceled within a first time period, the movement command from after an elapse of the first time period until the input of the operation signal is canceled, and output the operation command when the input of the operation signal is canceled within the first time period; and a control apparatus including a reception means for receiving the movement command and the operation command output from the input apparatus, and a processing means for controlling display of the movement of the image, execution of predetermined processing, or display of a drag operation of the image in accordance with an input timing of the movement command and the operation command input via the reception means.

10. A control method comprising:
    detecting a 3-dimensional movement of a casing of an input apparatus and outputting a detection signal corresponding to the movement of the casing;
    outputting a movement command that corresponds to a displacement amount of an image on a screen, the displacement amount corresponding to the detection signal;
    controlling a movement of the image on the screen in accordance with the movement command;
    outputting an operation command that corresponds to an operation signal with respect to the input apparatus that is unrelated to the movement of the casing, the operation signal being input via an operation section of the casing;
    executing predetermined processing in accordance with the operation command; and
    controlling the output of the movement command and the output of the operation command so that, when the input of the operation signal is not canceled within a first time period, the movement command is output from after an elapse of the first time period until the input of the operation signal is canceled, and the operation command is output when the input of the operation signal is canceled within the first time period.

11. A control method comprising:
    detecting a 3-dimensional movement of a casing of an input apparatus and outputting a detection signal corresponding to the movement of the casing;
    outputting a movement command that corresponds to a displacement amount of an image on a screen, the displacement amount corresponding to the detection signal;
    controlling a movement of the image on the screen in accordance with the movement command;
    outputting an operation command that corresponds to an operation signal with respect to the input apparatus that is unrelated to the movement of the casing, the operation signal being input via one operation section provided to the casing;
    controlling an output timing of the movement command and the operation command in accordance with an input timing of the output operation signal;
    wherein the output control means for controlling the output means to output, when the input of the operation signal is not canceled within a first time period, the movement command from after an elapse of the first time period until the input of the operation signal is canceled, and output the operation command when the input of the operation signal is canceled within the first time period; and
    controlling display of the movement of the image, execution of predetermined processing, or display of a drag operation of the image in accordance with an input timing of the movement command and the operation command.

12. A handheld apparatus controlling a movement of an image displayed on a screen, the handheld apparatus comprising:
    a display section to display the screen;
    a casing;
    a sensor to detect a 3-dimensional movement of the casing and output a detection signal corresponding to the movement of the casing;
    an operation section to input an operation signal with respect to the handheld apparatus that is unrelated to the movement of the casing;
    an output means for outputting a movement command that corresponds to a displacement amount of the image on the screen, the displacement amount corresponding to the detection signal, and an operation command that corresponds to the operation signal input via the operation section;
    an output control means for controlling the output means to output, when the operation signal is input but the input of the operation signal is not canceled within a first time period, the movement command from after an elapse of the first time period until the input of the operation signal is canceled, and output the operation command when the input of the operation signal is canceled within the first time period; and
    a processing means for controlling display of the screen so that the image is moved in accordance with the output movement command, and executing predetermined processing in accordance with the output operation command.

13. A handheld apparatus controlling a movement of an image displayed on a screen, the handheld apparatus comprising:
    a display section to display the screen;
    a casing;
        a sensor to detect a 3-dimensional movement of the casing and output a detection signal corresponding to the movement of the casing;
        one operation section to input an operation signal with respect to the handheld apparatus that is unrelated to the movement of the casing;
        an output means for outputting a movement command that corresponds to a displacement amount of the image on the screen, the displacement amount corresponding to the detection signal, and an operation command that corresponds to the operation signal input via the operation section;
        an output control means for controlling an output timing of the movement command and the operation command in accordance with an input timing of the output operation signal; and
        a processing means for controlling display of the movement of the image, execution of predetermined processing, or display of a drag operation of the image in accordance with an input timing of the movement command and the operation command that have been output;
        wherein the output control means for controlling the output means to output, when the input of the operation signal is not canceled within a first time period, the movement command from after an elapse of the first time period until the input of the operation signal is canceled, and output the operation command when the input of the operation signal is canceled within the first time period.

* * * * *